(12) United States Patent
Kaminkow

(10) Patent No.: US 7,993,197 B2
(45) Date of Patent: Aug. 9, 2011

(54) FLEXIBLE LOYALTY POINTS PROGRAMS

(75) Inventor: Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/927,742

(22) Filed: Aug. 10, 2001

(65) Prior Publication Data

US 2003/0032474 A1    Feb. 13, 2003

(51) Int. Cl.
*A63F 9/24* (2006.01)
(52) U.S. Cl. ............................................ 463/25; 463/16
(58) Field of Classification Search .................... 463/25, 463/16

See application file for complete search history.

(56) References Cited

U.S. PATENT DOCUMENTS

| | | |
|---|---|---|
| 4,335,809 A | 6/1982 | Wain et al. |
| 4,359,633 A | 11/1982 | Bianco |
| 4,669,730 A | 6/1987 | Small |
| 4,764,666 A | 8/1988 | Bergeron |
| 4,856,787 A | 8/1989 | Itkis |
| 5,129,652 A | 7/1992 | Wilkinson ................ 273/139 |
| 5,169,155 A | 12/1992 | Soules et al. |
| 5,257,179 A | 10/1993 | De Mar |
| 5,258,837 A | 11/1993 | Gormley |
| 5,265,874 A | 11/1993 | Dickinson et al. |
| 5,290,033 A | 3/1994 | Bittner et al. |
| 5,318,298 A | 6/1994 | Kelly et al. |
| 5,321,241 A | 6/1994 | Craine |
| 5,326,104 A | 7/1994 | Pease et al. |
| 5,373,440 A | 12/1994 | Cohen et al. |
| 5,557,086 A | 9/1996 | Schulze et al. |
| 5,581,257 A | 12/1996 | Greene et al. |
| 5,586,936 A | 12/1996 | Bennett et al. |
| 5,643,086 A | 7/1997 | Alcorn et al. ................ 463/29 |
| 5,655,961 A | 8/1997 | Acres et al. |
| 5,702,304 A | 12/1997 | Acres et al. |
| 5,722,891 A | 3/1998 | Inoue |

(Continued)

FOREIGN PATENT DOCUMENTS

DE    19855117    5/2000

(Continued)

OTHER PUBLICATIONS

The Straight Dope, Jul. 24, 2001, http://www.straightdope.Com/mailbag/mgreenstamps.html.*

(Continued)

*Primary Examiner* — David L Lewis
*Assistant Examiner* — Omkar Deodhar
(74) *Attorney, Agent, or Firm* — Weaver Austin Villeneuve & Sampson LLP

(57) ABSTRACT

A disclosed a loyalty program transaction network provides a plurality of loyalty program instrument generation sites that award loyalty points. The loyalty points may be stored on loyalty point instruments such as printed tickets, magnetic-striped cards, room keys, portable wireless devices and smart cards. The loyalty program instruments may be issued to a patron of a gaming establishment without receiving identification information from the patron. At a loyalty program validation site, the loyalty program instruments may be used to redeem loyalty points for goods and services or the loyalty program instruments may be used to add loyalty points to an existing loyalty program account. Loyalty points may be earned by the patron during a number of activities such as playing a gaming machine, playing a game of chance, a food purchase, an entertainment purchase, a transportation purchase, a lodging purchase, a merchandise purchase and a service purchase.

49 Claims, 8 Drawing Sheets

U.S. PATENT DOCUMENTS

| | | | |
|---|---|---|---|
| 5,741,183 A | 4/1998 | Acres et al. ............... 463/42 |
| 5,741,184 A | 4/1998 | Takemoto et al. |
| 5,743,798 A | 4/1998 | Adams et al. |
| 5,752,882 A | 5/1998 | Acres et al. |
| 5,761,647 A * | 6/1998 | Boushy ............... 463/25 |
| 5,768,382 A | 6/1998 | Schneier et al. |
| 5,770,533 A | 6/1998 | Franchi |
| 5,816,918 A * | 10/1998 | Kelly et al. ............... 463/16 |
| 5,820,459 A | 10/1998 | Acres et al. |
| 5,823,879 A | 10/1998 | Goldberg et al. |
| 5,833,540 A | 11/1998 | Miodunski et al. ............... 463/42 |
| 5,836,817 A | 11/1998 | Acres et al. |
| 5,871,398 A | 2/1999 | Schneier et al. |
| 5,876,284 A | 3/1999 | Acres et al. |
| 5,892,661 A | 4/1999 | Stafford et al. |
| 5,951,397 A | 9/1999 | Dickinson ............... 463/36 |
| 5,952,922 A | 9/1999 | Shober |
| 5,967,896 A | 10/1999 | Jorash et al. |
| 5,971,271 A | 10/1999 | Wynn et al. |
| 5,977,913 A | 11/1999 | Christ |
| 5,988,501 A | 11/1999 | Murakami et al. |
| 6,003,013 A | 12/1999 | Boushy et al. ............... 705/10 |
| 6,019,283 A | 2/2000 | Lucero |
| 6,048,269 A * | 4/2000 | Burns et al. ............... 463/25 |
| 6,048,271 A | 4/2000 | Barcelou |
| 6,089,975 A | 7/2000 | Dunn ............... 463/16 |
| 6,104,815 A | 8/2000 | Alcorn et al. ............... 380/251 |
| 6,106,396 A | 8/2000 | Alcorn et al. ............... 463/29 |
| 6,110,041 A | 8/2000 | Walker et al. |
| 6,113,495 A | 9/2000 | Walker et al. ............... 463/42 |
| 6,135,884 A | 10/2000 | Hedrick et al. |
| 6,142,876 A * | 11/2000 | Cumbers ............... 235/380 |
| 6,144,332 A | 11/2000 | Reindl et al. |
| 6,149,522 A | 11/2000 | Alcorn et al. ............... 463/29 |
| 6,161,743 A * | 12/2000 | Shoemaker, Jr. ............... 226/156 |
| 6,162,122 A | 12/2000 | Acres et al. ............... 463/29 |
| 6,165,071 A | 12/2000 | Weiss |
| 6,183,362 B1 | 2/2001 | Boushy ............... 463/25 |
| 6,186,893 B1 | 2/2001 | Walker et al. |
| 6,193,156 B1 | 2/2001 | Han et al. |
| 6,193,608 B1 | 2/2001 | Walker et al. |
| 6,203,430 B1 | 3/2001 | Walker et al. |
| 6,210,279 B1 | 4/2001 | Dickinson ............... 463/37 |
| 6,234,900 B1 | 5/2001 | Cumbers |
| 6,244,958 B1 | 6/2001 | Acres ............... 463/26 |
| 6,254,006 B1 | 7/2001 | Mish |
| 6,254,483 B1 | 7/2001 | Acres |
| 6,265,977 B1 | 7/2001 | Vega et al. |
| 6,267,671 B1 * | 7/2001 | Hogan ............... 463/25 |
| 6,280,326 B1 * | 8/2001 | Saunders ............... 235/379 |
| 6,285,295 B1 | 9/2001 | Casden |
| 6,293,866 B1 | 9/2001 | Walker et al. |
| 6,302,793 B1 | 10/2001 | Fertitta et al. |
| 6,319,122 B1 * | 11/2001 | Packes et al. ............... 463/16 |
| 6,319,125 B1 * | 11/2001 | Acres ............... 463/25 |
| 6,329,213 B1 | 12/2001 | Tuttle et al. |
| 6,358,149 B1 | 3/2002 | Schneider et al. |
| 6,379,247 B1 * | 4/2002 | Walker et al. ............... 273/274 |
| 6,383,076 B1 | 5/2002 | Tiedeken |
| 6,394,907 B1 * | 5/2002 | Rowe ............... 273/143 R |
| 6,398,649 B1 | 6/2002 | Sugaya |
| 6,400,272 B1 | 6/2002 | Holtzman et al. |
| 6,409,595 B1 | 6/2002 | Uihlein et al. |
| 6,419,190 B1 | 7/2002 | Nguegang |
| 6,424,884 B1 | 7/2002 | Brooke, Jr. et al. |
| 6,431,983 B2 | 8/2002 | Acres |
| 6,471,590 B2 | 10/2002 | Saunders |
| 6,514,140 B1 | 2/2003 | Storch |
| 6,547,664 B2 | 4/2003 | Saunders |
| 6,554,705 B1 | 4/2003 | Cumbers |
| 6,558,256 B1 | 5/2003 | Saunders |
| 6,571,216 B1 | 5/2003 | Garg et al. |
| 6,606,744 B1 | 8/2003 | Mikurak |
| 6,612,575 B1 | 9/2003 | Cole et al. |
| 6,612,928 B1 | 9/2003 | Bradford et al. |
| 6,628,939 B2 | 9/2003 | Paulsen |
| 6,629,019 B2 | 9/2003 | Legge et al. |
| 6,641,035 B1 | 11/2003 | Predescu et al. |
| 6,641,484 B2 | 11/2003 | Oles et al. |
| 6,675,152 B1 | 1/2004 | Prasad et al. |
| 6,682,421 B1 | 1/2004 | Rowe et al. |
| 6,712,698 B2 | 3/2004 | Paulsent et al. |
| 6,778,820 B2 | 8/2004 | Tendler |
| 6,811,486 B1 | 11/2004 | Luciano, Jr. |
| 6,812,824 B1 | 11/2004 | Goldinger et al. |
| 6,813,609 B2 | 11/2004 | Wilson |
| 6,848,995 B1 | 2/2005 | Walker et al. |
| 6,852,031 B1 | 2/2005 | Rowe |
| 6,878,062 B2 | 4/2005 | Bjorklund et al. |
| 6,884,173 B2 | 4/2005 | Gauselmann |
| 6,887,154 B1 | 5/2005 | Luciano et al. |
| 6,912,398 B1 | 6/2005 | Domnitz |
| 6,920,561 B1 | 7/2005 | Gould et al. |
| 6,923,721 B2 | 8/2005 | Luciano et al. |
| 6,923,724 B2 | 8/2005 | Williams |
| 6,935,958 B2 | 8/2005 | Nelson |
| 7,022,017 B1 | 4/2006 | Halbritter et al. |
| 7,025,674 B2 | 4/2006 | Adams et al. |
| 7,083,518 B2 | 8/2006 | Rowe |
| 7,094,149 B2 | 8/2006 | Walker et al. |
| 7,116,987 B2 | 10/2006 | Spain, Jr. et al. |
| 7,116,988 B2 | 10/2006 | Dietrich et al. |
| 7,175,528 B1 | 2/2007 | Blake Cumbers |
| 7,303,475 B2 | 12/2007 | Britt et al. |
| 7,311,605 B2 | 12/2007 | Moser et al. |
| 2002/0034978 A1 | 3/2002 | Legge et al. |
| 2002/0077173 A1 | 6/2002 | Luciano et al. |
| 2002/0077174 A1 | 6/2002 | Luciano et al. |
| 2002/0107715 A1 | 8/2002 | Pace et al. |
| 2002/0128057 A1 | 9/2002 | Walker et al. |
| 2002/0142841 A1 | 10/2002 | Boushy |
| 2002/0169021 A1 | 11/2002 | Urie et al. |
| 2002/0187834 A1 | 12/2002 | Rowe et al. |
| 2002/0194619 A1 | 12/2002 | Chang et al. |
| 2002/0198775 A1 | 12/2002 | Ryan |
| 2003/0027635 A1 | 2/2003 | Walker et al. |
| 2003/0032474 A1 | 2/2003 | Kaminkow |
| 2003/0036425 A1 | 2/2003 | Kaminkow et al. |
| 2003/0045354 A1 | 3/2003 | Giobbi |
| 2003/0069071 A1 | 4/2003 | Britt et al. |
| 2003/0078101 A1 | 4/2003 | Schneider et al. |
| 2003/0083943 A1 | 5/2003 | Adams et al. |
| 2003/0104865 A1 | 6/2003 | Itkis et al. |
| 2003/0162593 A1 | 8/2003 | Griswold |
| 2003/0195037 A1 | 10/2003 | Vuong et al. |
| 2003/0199321 A1 | 10/2003 | Williams |
| 2003/0232647 A1 | 12/2003 | Moser et al. |
| 2004/0092307 A1 | 5/2004 | George et al. |
| 2004/0254005 A1 | 12/2004 | Shackleford et al. |
| 2005/0012818 A1 | 1/2005 | Kiely et al. |
| 2005/0051965 A1 | 3/2005 | Gururajan et al. |
| 2005/0054439 A1 | 3/2005 | Rowe et al. |
| 2005/0116020 A1 | 6/2005 | Smolucha |
| 2005/0143169 A1 | 6/2005 | Nguyen et al. |
| 2005/0255919 A1 | 11/2005 | Nelson |
| 2006/0040741 A1 | 2/2006 | Griswold et al. |
| 2006/0046842 A1 | 3/2006 | Mattice |
| 2006/0052169 A1 | 3/2006 | Britt et al. |
| 2006/0076401 A1 | 4/2006 | Frerking |
| 2006/0084488 A1 | 4/2006 | Kinsley et al. |
| 2006/0148561 A1 | 7/2006 | Moser et al. |
| 2006/0252521 A1 | 11/2006 | Gururajan et al. |
| 2006/0252554 A1 | 11/2006 | Gururajan et al. |
| 2006/0258427 A1 | 11/2006 | Rowe |
| 2006/0258442 A1 | 11/2006 | Ryan |
| 2007/0087834 A1 | 4/2007 | Moser et al. |
| 2007/0117623 A1 | 5/2007 | Nelson |
| 2007/0271113 A1 | 11/2007 | Nelson |
| 2008/0051193 A1 | 2/2008 | Kamikav et al. |
| 2009/0055204 A1 | 2/2009 | Pennington |
| 2009/0055205 A1 | 2/2009 | Nguyen |

FOREIGN PATENT DOCUMENTS

| | | |
|---|---|---|
| EP | 360613 | 4/1995 |
| EP | 762341 | 12/1997 |
| EP | 1096438 | 2/2001 |
| EP | 1139310 | 4/2001 |

| | | |
|---|---|---|
| EP | 1120757 A2 | 8/2001 |
| EP | 1 351 180 | 10/2003 |
| FR | 2 711 001 | 4/1995 |
| FR | 2 816 742 | 5/2002 |
| JP | 07-505079 | 6/1995 |
| JP | 11-019330 | 1/1999 |
| JP | 2000-210464 | 8/2000 |
| JP | 2002-74506 | 3/2002 |
| JP | 2002-78954 | 3/2002 |
| WO | 96-00950 | 1/1996 |
| WO | 98-12648 | 3/1998 |
| WO | WO 98/47589 | 10/1998 |
| WO | WO00/38089 | 6/2000 |
| WO | 00-52655 | 8/2000 |
| WO | 00-78419 | 12/2000 |
| WO | 01-46923 | 6/2001 |
| WO | WO02/058020 | 7/2002 |
| WO | WO 03/013678 | 2/2003 |
| WO | WO 03/025828 | 3/2003 |
| WO | 03-027970 | 4/2003 |
| WO | WO 03073386 | 9/2003 |
| WO | 03-089088 | 10/2003 |
| WO | 03-107287 | 12/2003 |
| WO | 2004-013820 | 2/2004 |
| WO | 2004/052656 | 6/2004 |
| WO | WO 2004/052656 | 6/2004 |
| WO | 2004-064354 | 7/2004 |
| WO | 95-24689 | 9/2005 |
| WO | 2005-098650 | 10/2005 |
| WO | 2006-020413 | 2/2006 |
| WO | 2006-105182 | 10/2006 |
| WO | 2008-067212 | 6/2008 |
| WO | 2008-091473 | 7/2008 |
| WO | WO2009/026180 | 2/2009 |
| WO | WO2009/026295 | 2/2009 |

OTHER PUBLICATIONS

S&H Greenpoints Web page,2001, Sperry & Hutchinson Company, Inc. http://www.greenpoints.com.*
Marshall Fey, Slot Machines, A Pictorial History of the First 100 years, 1983, Liberty Belle Books, pp. 100-117.*
Foreign Search Report dated Jul. 7, 2005, from corresponding UK Application No. 0502535.8 (2 pages).
International Search Report and Written Opinion dated Nov. 15, 2005 for corresponding PCT Application No. PCT/US2005/026777 (7 pages).
Office Action dated Oct. 4, 2005 from U.S. Appl. No. 10/214,936.
Office Action dated Jun. 30, 2006 from U.S. Appl. No. 10/214,936.
Office Action dated Oct. 31, 2006 from U.S. Appl. No. 10/214,936.
Combined Search and Examination Report dated Feb. 15, 2007, from corresponding Great Britain Application No. GB0620781.5.
Office Action dated Apr. 24, 2007 from U.S. Appl. No. 10/214,936.
V.L. Engineering, "Hand held terminal-decoder for invisible bar codes," Jun. 20, 2002. http://www.vlengineering.com/products/wizard_CT6.html.
Economist, "Where's the Smart Money?" Feb. 9, 2002. www.Economist.com.
Summary of Herbst Presentation given by Rick Rowe on Aug. 12, 2003.
Sandia National Laboratories, "Technology Highlight: Spread Spectrum Barcode Technology," Sandia/California News, downloaded Oct. 27, 2005.
Symbol, Wireless for Beginners, Symbol Tech. Sep. 1, 2001, 12 pages.
RFID "Basics Primer", Automatic Identification Manufacturers, Sep. 28, 1999, pp. 1-14. http://www.aimglobal.org/technologies/rfid/resources/papers/rfid_basics_primer.htm.
Bar Code 1, "2-Dimensional Bar Code Page", Adams Communication, Jun. 20, 2002, pp. 1-13. http://www.adams1.com/pub/russadam/stack.html.
Bar Code 1, "Bar Code Readers Page", Adams Communication, Jun. 20, 2002, pp. 1-5. http://www.adams1.com/pub/russadam/readers.html.
Symbol®, "Encoded Fingerprint Scanned by Symbol PDF417 Reader", Symbol Tech, Dec. 22, 1998, pp. 1-3. http://www.symbol.com/news/pressreleases/pressreleases_pdf417prod_ph.htm.
Rankl W et al.: "Handbuch der Chipkarten, Kontaktbehaftete Karten" Handbuch Der Chipkarten. Aufbau-Funktionsweise-Einsatz Von Smart Cards, Muenchen: Carl Hanser Verlag, DE, 1999, pp. 110-125, XP002242017.
Office Action dated Sep. 5, 2007 from U.S. Appl. No. 10/214,936.
Office Action dated Oct. 5, 2007 from U.S. Appl. No. 10/914,944.
Examination Report dated Jan. 16, 2008 from European Patent Application No. 05776662.8.
Examination Report dated Jan. 30, 2008 from United Kingdom Patent Application No. 0620781.5.
Japanese Office Action dated Mar. 5, 2008 from related U.S. Application No. 2004-256237, 4 pgs.
Office Action dated Apr. 16, 2008 from related U.S. Appl. No. 10/914,944.
Final Office Action dated Jun. 12, 2008 from related U.S. Appl. No. 10/214,936.
Office Action dated May 28, 2008 from related U.S. Appl. No. 11/830,739.
United Kingdom Office Action dated Jun. 24, 2008, from related UK Application No. 0620781.5, 2 pgs.
Chinese Office Action dated Jul. 18, 2008 from related CN Application No. 200580027057.X, 6 pgs.
Australian Office Action dated Jul. 18, 2008 from related AU Application No. 2003257941, 3 pgs.
International Search Report mailed Oct. 18, 2002 from PCT Application No. PCT/US2002/025105; 3 pgs.
International Search Report mailed Mar. 3, 2004 for PCT Application No. PCT/US2003/023872; 7 pgs.
Japanese Office Action dated Dec. 8, 2008 from related JP Application No. 2004-256237; 4 pgs.
U.S. Office Action dated Dec. 23, 2008 from U.S. Appl. No. 10/214,936; 16 pgs.
U.S. Final Office Action dated Feb. 19, 2009 from U.S. Appl. No. 11/830,739; 13 pgs.
U.S. Office Action dated Apr. 22, 2009 from related U.S. Appl. No. 10/914,944; 19 pgs.
China Office Action dated Jun. 12, 2009 from Application No. 200580027057.X; 5 pgs.
Final Office Action dated Aug. 21, 2009 for U.S. Appl. No. 10/214,936.
Final Office Action date Aug. 19, 2009 for U.S. Appl. No. 11/830,739.
Office Action dated Oct. 16, 2009 from related U.S. Appl. No. 11/262,059.
US Office Action, mailed Mar. 2, 2004, from U.S. Appl. No. 10/170,278.
US Office Action, mailed Apr. 4, 2005 (non-responsive), from U.S. Appl. No. 10/170,278.
US Office Action, mailed Sep. 9, 2004, from U.S. Appl. No. 10/170,278.
US Office Action, mailed Jan. 11, 2007, from U.S. Appl. No. 10/170,278.
Supplemental US Office Action, mailed Jan. 19, 2007, from U.S. Appl. No. 10/170,278.
Notice of Allowance for U.S. Appl. No. 10/170,278 dated Sep. 7, 2005.
Notice of Allowance for U.S. Appl. No. 10/170,278 dated Aug. 7, 2007.
Allowed claims for U.S. Appl. No. 10/170,278.
Final Office Action, mailed Jan. 25, 2007, from U.S. Appl. No. 11/303,444.
US Office Action, mailed Feb. 25, 2008, from U.S. Appl. No. 11/655,496.
US Final Office Action, mailed Oct. 1, 2008, from U.S. Appl. No. 11/655,496.
US Office Action, mailed Jan. 26, 2009, from U.S. Appl. No. 11/655,496.
US Office Action, mailed Sep. 8, 2009, from U.S. Appl. No. 11/565,424.
Combined Search and Examination Report dated Aug. 31, 2006 for GB Patent Application No. GB0611551.3.
Combined Search and Examination Report dated Aug. 31, 2006 for GB Patent Application No. GB0611545.5.

Written Opinion mailed Mar. 8, 2004 for PCT Application No. PCT/US2003/023872.
Combined Search and Examination Report from corresponding UK Patent Application No. 0611545.5, dated Aug. 31, 2006 5.
Examiner's Report for Australian Patent Application No. 2003243570 dated Sep. 19, 2008.
Communication regarding Examination for European Patent Application No. 03 760 364.4-2221 dated May 20, 2005.
Preliminary Opinion European Patent application No. 03760364.4-2221 dated May 10, 2006.
International Preliminary Examination Report with International Search Report for PCT Application No. PCT/US03/18826 mailed Apr. 8, 2004.
Written Opinion for PCT Application No. PCT/US03/18826 mailed Jan. 15, 2004.
Written Opinion mailed Jun. 23, 2008 for PCT Application No. PCT/US2007/085117.
International Search Report mailed Jun. 23, 2008, for PCT Application No. PCT/US2007/085117.
International Search Report mailed Jun. 13, 2008 for PCT Application No. PCT/US2007/088920.
Written Opinion mailed Jun. 21, 2008 for PCT Application No. PCT/US2007/088920.
International Preliminary Examination Report with International Search Report for PCT Application No. PCT/US2007/088920 mailed Jul. 30, 2009.
International Search Report mailed Nov. 7, 2008 for PCT Application No. PCT/US2008/073388.
Written Opinion mailed Nov. 7, 2008 for PCT Application No. PCT/US2008/073388.
International Search Report mailed Feb. 13, 2009 for PCT Application No. PCT/US2008/073599.
Written Opinion mailed Feb. 13, 2009 for PCT Application No. PCT/US2008/073599.
Converting Signal Strength Percentage to dBm Values, Joe Bardwell, Nov. 2002.
Doppler Direction Finder, Radio Direction Finder Kit, Ramsey Electronics Mode No. DDF1, Copyright 1998 by Ramsey Electronics, Inc.
N. Patwari, A. O. Hero and J. Costa, "Learning Sensor Location from Signal Strength and Connectivity," in Secure Localization and Time Synchronization for Wireless Sensor and Ad Hoc Networks, Eds. Radha Poovendran, Cliff Wang, and Sumit Roy, Advances in Information Security series, vol. 30, Springer, Dec. 2006, ISBN 978-0-387-32721-1.
Bronstein et al "Robust expression-invariant face recognition from partially missing data", Computer Vision-ECCV 2006,ISBN 3-540-33836-5, Jul. 2006, pp. 396-408.
EPCglobal Architecture Framework, Final Version, Jul. 1, 2005, 53 pp.
Electronics Now, Whats News, 'In-Charge Cards', Aug. 1993, p. 4.
Bazakos et al. "Fast Access Control Technology Solutions", *IEEE Conference on Advanced Video Signal Based Surveillance*, Italy, Sep. 15-16, 2005.
Dawdall et al., "A Face Detection Method Based on Multi-Band Feature Extraction in the Near-IR Spectrum," *Proceedings IEEE Workshop on Computer Vision Beyond the Visiblespectrum: Methods and Applications*, Dec. 14, 2001, XP002369556.
Final Office Action dated Mar. 8, 2010 for U.S. Appl. No. 11/262,059.
Office Action dated Dec. 7, 2009 for U.S. Appl. No. 10/914,944.
Office Action dated Apr. 26, 2010 for U.S. Appl. No. 10/914,944.
US Final Office Action, mailed Feb. 5, 2010, from U.S. Appl. No. 11/655,496.
US Final Office Action, mailed Mar. 8, 2010, from U.S. Appl. No. 11/565,424.
Chinese Office Action dated Jan. 8, 2010 from related CN Application No. 200580027057.X.
Decision to Refuse a European Patent Application dated Feb. 12, 2007 for EP Patent Application No. 03 760 364.4-2221.
Google search on the definition of "encrypt" at: http://www.google.com/search?h1=en&rlz+1T4GGLD_en_US345 &q=define%3AEncrypt, pp. 1-2, retreieved on Feb. 26, 2010.
PCT International Preliminary Examination Report dated May 27, 2003 issued in PCT/US2002/025105.
PCT International Preliminary Examination Report dated May 27, 2004 issued in PCT/US2003/023872.
PCT International Preliminary Examination Report dated Feb. 24, 2010 issued in PCT/US2008/073388.
PCT International Preliminary Examination Report dated Feb. 24, 2010 issued in PCT/US2008/073599.
Office Action dated Jun. 25, 2010 for U.S. Appl. No. 10/214,936.
Notice of Allowance and Fee(s) due dated Aug. 23, 2010 for U.S. Appl. No. 11/830,739.
Final Office Action dated Sep. 23, 2010 for U.S. Appl. No. 10/914,944.
Office Action dated Aug. 5, 2010 for U.S. Appl. No. 11/655,496.
Office Action dated Sep. 24, 2010 for U.S. Appl. No. 11/565,424.
Office Communication dated Sep. 29, 2010 considering IDS references for U.S. Appl. No. 11/830,739.
U.S. Notice of Allowance, Examiner Amendment and Interview Summary dated Dec. 13, 2010 issued in U.S. Appl. No. 10/214,936.
U.S. Notice of Allowance dated Apr. 1, 2011 issued in U.S. Appl. No. 10/214,936.
U.S. Notice of Allowance, Interview Summary, and Examiner's Amendment dated Dec. 29, 2010 issued in U.S. Appl. No. 11/830,739.
U.S. Advisory Action dated Mar. 15, 2010 issued in U.S. Appl. No. 10/914,944.
U.S. Office Action dated Mar. 15, 2011 issued in U.S. Appl. No. 10/914,944.
U.S. Notice of Abandonment dated Aug. 20, 2007 issued in U.S. Appl. No. 11/303,444.
U.S. Office Action dated Feb. 28, 2011 issued in U.S. Appl. No. 11/565,424.
U.S. Final Office Action dated Jan. 25, 2011 issued in U.S. Appl. No. 11/655,496.
U.S. Office Action dated Dec. 1, 2010 issued in U.S. Appl. No. 11/829,028.
PCT International Preliminary Report on Patentability and Written Opinion dated Feb. 13, 2007 issued in PCT/US2005/026777.

\* cited by examiner

FLEXIBLE LOYALTY POINTS PROGRAMS

BACKGROUND OF THE INVENTION

This invention relates to game playing methods for gaming machines, such as video slot machines and video poker machines, or for tracked table games. More particularly, the present invention relates to methods and apparatus of allowing game players to participate in loyalty programs on gaming machines and during other gaming activities.

As technology in the gaming industry progresses, the traditional mechanically driven reel slot machines are being replaced or supplemented with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities, is an important consideration for an operator of a gaming establishment.

One related method of gaining and maintaining a game player's interest in game play is loyalty point programs, such as player tracking programs, offered at various casinos. Loyalty point programs provide rewards to players that typically correspond to the player's level of patronage (e.g., to the player's playing frequency and/or total amount of game plays at a given casino). Loyalty point rewards may be free meals, free lodging and/or free entertainment. These rewards may help to sustain a game player's interest in additional game play during a visit to a gaming establishment and may entice a player to visit a gaming establishment to partake in various gaming activities.

In general, loyalty programs may be applied to any game of chance offered at a gaming establishment. An example of a hardware and/or software implementation of a loyalty reward program with respect to a number of gaming machines is described as follows. FIG. 1 is a block diagram of a number of gaming machines with player tracking units connected to servers providing player tracking services. In casino 150, gaming machines 100, 101, 102 and 103 are connected, via the data collection unit (DCU) to the player tracking/accounting server 120. The DCU 106, which may be connected to up to 32 player tracking units in a particular example, consolidates the information gathered from player tracking units in communication with the DCU 106 and forwards the information to a player tracking account server such as 120.

In another casino 151, a different player tracking server 121 is connected to gaming machines 130 and 131. In yet another casino 152, a separate player tracking server 122 is connected to gaming machines 132 and 133.

In gaming machine 100 of casino 150, a player tracking unit 107 and slot machine interface board (SMIB) 103 are mounted within a main cabinet 8 of the gaming machine. A top box 130 is mounted on top of the main cabinet 8 of the gaming machine. In many types of gaming machines, the player tracking unit is mounted within the top box 130. Usually, player tracking units, such as 107, and SMIBs, such as 103, are manufactured as separate units before installation into a gaming machine. The player tracking unit 107 includes three player tracking devices, a card reader 24, a key pad 22, and a display 16, all mounted within the unit.

The player tracking unit 107 communicates with the player tracking server via the SMIB 103, a main communication board 110 and the data collection unit 106. The player tracking unit 107 is usually connected to the master gaming controller 104 via a serial connection of some type and communicates with the master gaming controller 104 using a communication protocol of some type. For example, the master gaming controller 104 may employ a subset of the Slot Accounting System (SAS protocol) developed by International Game Technology of Reno, Nev. to communicate with the player tracking unit 107.

Typically, when a game player wants to play a game on a gaming machine and utilize the player tracking services available through the player tracking unit, a game player inserts a player tracking card, such as a magnetic striped card, into the card reader 24. After the magnetic striped card has been so inserted, the player tracking unit 107 may detect this event and receive certain identification information contained on the card. For example, a player's name, address, and player tracking account number encoded on the magnetic striped card, may be received by the player tracking unit 107. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

After a player has inserted her or his player tracking card into the card reader 24, the player tracking unit 107 may command the display 16 to display the game player's name on the display 16 and also, may optionally display a message requesting the game player to validate their identity by entering an identification code using the key pad 22. Once the game player's identity has been validated, the player tracking information is relayed to the player tracking server 120. Typically, the player tracking server 120 stores player tracking account records including the number of player tracking points previously accumulated by the player.

During game play on the gaming machine, the player tracking unit 120 may poll the master gaming controller 104 for game play information such as how much money the player has wagered on each game, the time when each game was initiated and the location of the gaming machine. The game play information is sent by the player tracking unit 107 to the player tracking server 120. While a player tracking card is inserted in the card reader 24, the player tracking server 120 may use the game play information provided by the player tracking unit 107 to generate player tracking points and add the points to a player tracking account identified by the player tracking card. The player tracking points generated by the player tracking server 120 are stored in a memory of some type on the player tracking server.

As suggested above, a player's incentive for using the player tracking services is awards provided by the gaming machine operator (e.g., the casino). Unfortunately, when player tracking identification information is not provided to the player tracking server 120 via the player tracking unit 107, player tracking points are not accrued for a game player participating in a game play session on gaming machine 100. For example, when a player tracking card is not inserted into the card reader 24, the player tracking card has been inserted incorrectly or the card reader is malfunctioning, a game player may not obtain player tracking points while participating in game play on gaming machine 100. This happens more frequently than one might imagine. Very often a player will forget to bring his/her playing card to a casino, or leave the card in his/her room, or possibly return from the swimming pool without a card and decide to play anyway.

Also, when the player uses a player tracking card that is incompatible with gaming machine 100, such as a player tracking card issued at another casino, player tracking points are not awarded to the player. Typically, each casino implements a player tracking program with player tracking cards that may only be used to earn player tracking points only at the casino where the card was issued. For instance, casino 150 may issue a player tracking card that is only valid at casino 150, casino 151 may issue a player tracking card that is only valid at casino 151, and casino 152 may issue a player tracking card that is only valid at casino 152. In this example, the player may be a member of the player tracking programs available at each of casinos 150, 151 and 152. Thus, when a player tries to use the card issued at casino 151 in casino 150 or in casino 152, the card will not work and the player will not earn player tracking points.

In many gaming establishments, loyalty programs that allow a player to earn "complimentaries" or "comps", such as free rooms/buffets/shows etc., during table game play are very common. A player may earn "comps" for playing table games, such as black jack, baccarat, pai gow poker, keno and roulette. Depending on the gaming establishment, a loyalty program based upon table game play may or may not be combined with a loyalty program based upon slot game play.

Comps at table games are awarded using a rating system. To get rated, a player must give their name to a casino service representative every time they sit down to play a table game. The player must supply their name even if they have only moved from one table to an adjacent table. During the player's game play at the table, a casino service representative, such as a pit boss, keeps track of, or rates, the player. This means that the casino service person writes down how much a player buys in for, what his average bet is, how fast they play, how long they play and how much they win or lose. When the player leaves the table their rating is handed in. The game play information from their table gaming session is entered into a computer usually connected a remote server that stores a record of the player's game playing history. If the player then asks for dinner for two at the coffee shop the pit boss can look up their game play history and, based on guidelines, which may vary from casino to casino, decide whether or not a comp is justified. When a comp is justified, the pit boss can offer the player a voucher valid for the requested comp.

Player tracking/comp cards and player tracking/comp programs are becoming more and more popular. They have become a de facto method of doing business at casinos. A player may belong to many different player tracking/comp programs and have many different player tracking cards corresponding to each program to which they belong. For example, a single player may belong to as many as 20-30 separate player tracking programs and have 20-30 player tracking cards. As indicated, a disadvantage of current player tracking programs using player tracking cards is that a game player may simply forget to bring her card, lose her card, bring the wrong card, or forget to insert it into the gaming machine. In each of these cases, the player will fail to earn player tracking points. The casino is deprived of valuable marketing information and loyalty incentive and the player is deprived of awards that would otherwise be provided. Thus, in view of the above, it would be desirable to provide apparatus and methods for player tracking programs that allow a player to obtain player tracking points without requiring player tracking card initiation in every case.

SUMMARY OF THE INVENTION

This invention addresses the needs indicated above by providing a loyalty program transaction system that decouples the loyalty point sessions (e.g., conventional player tracking game play sessions) from conventional loyalty point initiation events (e.g., insertions of player tracking cards). In embodiments of this invention, loyalty points are accrued automatically and/or immediately upon initiation of a game play session. This is distinguished from conventional loyalty points sessions, which are triggered only by loyalty points initiation events. During loyalty point sessions of this invention, loyalty points are accrued during game play without requiring a player to insert a player tracking card or otherwise specially initiate the loyalty session. Simply beginning a game play sequence may be enough to begin accrual in some embodiments.

Generally, methods of this invention may be characterized by the following sequence: 1) determining that a patron has begun an activity for which loyalty points (e.g. player tracking points or comp points) are accrued; 2) accruing loyalty points for the patron without the patron initiating a loyalty points session; and 3) awarding the patron loyalty points accrued during the activity.

Because players can begin to accrue loyalty points without first triggering the system with a loyalty point initiation event, the gaming machine and casino network need not recognize who is playing. Therefore, the player can accrue loyalty points anonymously. In other words, the casino or other owner of the loyalty points infrastructure awards loyalty points without knowing who is receiving such points. At the end of a loyalty points session (e.g., when the player is finished playing a particular machine), the system will award the accrued points to the player. This may be done anonymously or non-anonymously.

In an important class of embodiments, the system awards loyalty points in the form of a loyalty points instrument such as a ticket issued by the gaming machine. The sequence is performed anonymously. The player can subsequently redeem the ticket for more tangible awards such as rooms, drinks, meals, etc. Or the player can convert points on the ticket to points in his/her player tracking account via a separate transaction.

In another important class of embodiments, the system awards loyalty points by transferring them directly to the player's player tracking account. In this approach, the system need not issue a ticket or other indicia of accrued loyalty points. Instead, the player merely identifies herself at the end of the loyalty points session. This may be accomplished by keying in player identification information, inserting a player tracking card, providing biometric identification, etc. These embodiments are useful when the player begins playing a machine but forgets to first identify herself via a loyalty points initiation event.

One implementation of the invention provides a network with a plurality of loyalty program instrument generation sites that award loyalty points and/or loyalty points instruments. Loyalty point instruments store loyalty points and include various mediums such as printed tickets, magnetic-striped cards, room keys, portable devices with wireless interfaces, smart cards, and the like. The loyalty program instruments may be issued to a patron of a gaming establishment without receiving identification information from the patron. At a loyalty program validation site, the loyalty program instruments may be used to redeem loyalty points for goods and services or the loyalty program instruments may be used to add loyalty points to an existing loyalty program account (e.g., a player tracking account or a comp account). Loyalty points may be earned by the patron during a number of activities such as playing a gaming machine, playing a game of chance, a food purchase, an entertainment purchase, a transportation purchase, a lodging purchase, a merchandise purchase and a service purchase.

The loyalty points may be redeemed using at least one of a phone, a gaming machine, a clerk validation terminal, a cashier station, a casino kiosk, a hand-held wireless device, a web interface, a postal service, and a card or ticket reader at a restaurant, hotel or entertainment venue for example. The loyalty program instrument may designed or configured to store one or more of prize information, loyalty point information, an establishment, a location, a bar code, a instrument type, an issue date, a validation number, an issue time, an instrument number, an instrument sequence number and a machine number.

One aspect of the present invention provides a method of awarding loyalty points to patrons of a gaming establishment. The method may be generally characterized by the following sequence: 1) determining that a patron has begun an activity for which loyalty points are accrued; 2) accruing loyalty points for said patron during the activity; 3) awarding to the patron some or all of the loyalty points accrued during said activity; and 4) issuing to the patron a loyalty program instrument designed or configured to store the awarded loyalty points where the loyalty points are awarded to the patron without receiving identification information from the patron. The gaming establishment may be a casino or a gaming entity comprised of a plurality of venues. The activities for which loyalty points are accrued may be playing a gaming machine of the gaming establishment, playing a game of chance within the gaming establishment, a food purchase, an entertainment purchase, a transportation purchase, a lodging purchase, a merchandise purchase and a service purchase. A rate at which the patron accrues loyalty points may vary according to one or more of a time of day, days of a week, months of a year, an amount wagered, a game denomination, a promotional event, a game type and a rate of wagering.

As indicated, the patron may have a player tracking account with the gaming establishment. In this case, the accrued loyalty points may be awarded to the patron anonymously, without crediting the patron's player tracking account. Further, some or all of the accrued loyalty points may be converted to goods and services without ever crediting any of the loyalty points to a player tracking account of the patron. Alternatively, the loyalty points stored on the loyalty point instrument may be first credited to a player tracking account of the patron. The loyalty points may be credited to the patron's player tracking account using at least one of a phone, a gaming machine, a clerk validation terminal, a cashier station, a casino kiosk, a hand-held wireless device and a postal service.

Another aspect of the present invention provides a loyalty program transaction network in a game playing area. The loyalty program transaction network may be generally characterized as including: i) a plurality of loyalty program instrument generation sites designed or configured to award at least loyalty points where the loyalty points are stored on loyalty point instruments such as printed tickets, magnetic-striped cards, room keys, portable wireless devices and smart cards; ii) a plurality of loyalty program validation sites designed or configured to validate loyalty program instruments and to redeem loyalty points for goods and services; and iii) one or more loyalty program transaction servers designed or configured to store loyalty program transaction information and to approve loyalty program instrument transactions at the loyalty program validation site. The loyalty program validation sites and the loyalty program generation sites may be selected from the group consisting of a gaming machine, a clerk validation terminal, a cashier station, a casino kiosk and a hand-held wireless device. Some of the loyalty program generation sites and some of the loyalty program validation sites may be located at different properties in a gaming entity. Thus, the loyalty program transaction network may include a loyalty program transaction clearinghouse designed or configured to approve loyalty program transactions where the loyalty program transactions may occur at first property with a loyalty program instrument generated at a second property different from the first property.

Another aspect of the present invention pertains to methods of awarding loyalty points to an "anonymous game player" playing a gaming machine. The method may be generally characterized as including: 1) detecting a first gaming event at the gaming machine, 2) in response to the first gaming event, accruing loyalty points, 3) detecting a second gaming event initiated by the game player at the gaming machine; 4) determining an amount of loyalty points accrued between the first gaming event and the second gaming event wherein the accrued loyalty points are determined by a logic device located on the gaming machine; 5) awarding to the game player some or all of the accrued loyalty points; and 6) issuing to the game player a loyalty program instrument designed or configured to store the awarded loyalty points where the gaming machine issues the loyalty program instrument to the game player without receiving identification information from the game player. The loyalty program instrument may be of the type described above.

In particular embodiments, the first gaming event may be one or more of depositing currency into the gaming machine, depositing an indicia of credit into the gaming machine, inserting a card into a card reader located on the gaming machine, activating an input button on the gaming machine, inputting a loyalty program instrument into a gaming device on the gaming machine or entering a general code into the gaming machine. The second gaming event may be detecting zero credits registered on the gaming machine, detecting that the player has actuated a mechanism indicating that the second gaming event has occurred, detecting that a particular period of time has elapsed since the last game play or since the first gaming event, and the like. Importantly, the loyalty points may be accrued without receiving a player tracking card from the game player or without receiving player tracking information from the game player. The rate at which a player accrues loyalty points can vary as described above.

In other embodiments, the method may include one or more of the following: 1) storing information to the loyalty program instrument, 2) displaying the awarded amount of loyalty points to the game player, 3) performing a loyalty program instrument transaction, 4) storing loyalty program transaction information on a memory device located on the gaming machine, 5) sending loyalty program transaction information to a gaming device located outside of the gaming machine and 6) presenting a game play sequence between the first gaming event and the second gaming event wherein the game play sequence includes game play of one or more games such as video slot games, mechanical slot games, video black jack games, video poker games, video keno games, video pachinko games, video card games, video games of chance and combinations thereof.

Regarding use of the loyalty point instrument, the method may include i) inputting a first loyalty point instrument into the gaming machine using at least one of a card reader, a wireless interface, a bill validator and a ticket reader, ii) determining an amount of loyalty points stored on the first loyalty point instrument, iii) validating the first loyalty point instrument and iv) when the first loyalty point instrument has been validated, adding the loyalty points stored on the loyalty point instrument to an amount of loyalty points awarded to the game player.

In addition, the method may include a) displaying a prize menu where the prize menu includes one or more prizes redeemable for an amount of loyalty points, b) receiving a prize selection selected from the one or more prizes displayed on the prize menu; and c) when the amount of loyalty points required to redeem the prize is less than an amount of loyalty points available on the gaming machine, issuing a loyalty program instrument where the loyalty program instrument is used to redeem the selected prize.

Another aspect of the present invention provides a gaming machine. The gaming machine may be generally characterized as including: 1) a master gaming controller designed or configured to control a game play sequence comprising a presentation of one or more games on the gaming machine; 2) a memory storing logic for causing the master gaming controller to determine an amount of loyalty points accrued between a first gaming event and a second gaming event and to award to a game player some or all of the a loyalty points accrued between the first gaming event and the second gaming event where the loyalty points are awarded to the game player without receiving identification information from the game player and 3) an output mechanism, such as a card reader, a printer and a wireless interface, designed or configured to store a loyalty point information to a loyalty point instrument where the loyalty point information may include the awarded loyalty points.

In particular embodiments, the gaming machine may include a display for displaying loyalty point information. The loyalty point information displayed may be a plurality of goods and services items where each of the goods and services items is redeemable for a particular amount of loyalty points. The awarded loyalty points may be redeemed for one or more of the displayed goods and services items. The loyalty program instrument may store information about the one or more redeemed goods and services items.

In other embodiments, the gaming machine may include an input mechanism designed or configured to read loyalty point information stored on the loyalty point instrument where the input mechanism is a card reader, a bill validator, a wireless interface and a ticket reader. The gaming machine may also include a network interface where the network interface is used to communicate with one or more gaming devices used to perform loyalty program instrument transactions.

Certain implementation details of network based systems represent important embodiments of the invention. These will now be described in summary fashion. Understand that the invention is in no way limited to any of these embodiments— or to the detailed embodiments described elsewhere herein.

Another aspect of the present invention provides a method for performing a loyalty program transactions using a loyalty program server. The method may be generally characterized as including: 1) receiving a loyalty program validation request from a validation site where the loyalty program validation request is used to validate a loyalty program transaction involving a loyalty program instrument; 2) marking the loyalty program validation request pending; 3) generating a transaction validation reply; and 4) sending the transaction validation reply to the validation site. The validation site may be a cashier station, a casino kiosk, a gaming machine and a hand-held wireless device.

In particular embodiments, the loyalty point transactions may include one or more of the following a) redeeming loyalty points stored on a loyalty program instrument for goods or services, b) receiving a transaction confirmation from the validation site and marking the loyalty program transaction complete, c) identifying a gaming device which owns the loyalty program instrument and sending a validation request to the gaming device where the gaming device is a clerk validation terminal or a gaming machine, d) receiving customer identification information, receiving a loyalty point adjustment request to add loyalty points to a customer account corresponding to the received customer identification information and adding the loyalty points to the customer account and e) receiving customer identification information, receiving a loyalty point adjustment request to delete loyalty points from a customer account corresponding to the received customer identification information and deleting loyalty points from the customer account.

Another aspect of the present invention provides a method for validating a loyalty point instrument at validation site. The method may be generally characterized as including: 1) receiving a loyalty program instrument; 2) sending a loyalty program validation request to a loyalty program server where the loyalty program validation request contains information stored on the loyalty program instrument; 3) receiving a transaction validation reply from the loyalty program server; 4) when the loyalty point instrument is validated, sending a transaction confirmation to the loyalty program server; and 5) when the loyalty point instrument is not validated, sending a transaction cancellation to the loyalty program server. The validation site may be a gaming machine, a clerk validation terminal, a cashier station, a casino kiosk and a hand-held wireless device.

The method may also include one or more of the following a) receiving customer identification information and sending a loyalty point adjustment request to add loyalty points stored on the loyalty point instrument to a customer account corresponding to the received customer identification information; b) receiving customer identification information and sending a loyalty point adjustment request to delete loyalty points from a customer account corresponding to the received customer identification information; c) combining the loyalty points deleted from the customer account to an amount of loyalty points stored on the loyalty point instrument and using the combined loyalty points to redeem a prize; and d) issuing a second loyalty program instrument used to redeem the prize.

Another aspect of the present invention provides a method of validating a loyalty program instrument at a first property using a loyalty program instrument transaction clearinghouse where the loyalty program instrument was generated at a second property. The method may be characterized as including: 1) receiving a first transaction validation request containing transaction information from the first property wherein the first transaction validation request requests approval of a loyalty program instrument transaction; 2) sending a second transaction validation request to the second property; 3) receiving a first transaction validation reply from the second property; and 4) sending a second transaction validation reply to the first property wherein the second transaction validation reply contains transaction information indicating the loyalty program instrument transaction has been approved or has been rejected. A first owner of the first property may be different from a second owner of the second property or a first owner of the first property may be the same as a second owner of the second property.

In particular embodiments, the method may include one or more of the following: a) when the loyalty point instrument transaction is approved, charging an amount to a property owner, b) when a loyalty program instrument transaction is approved, storing transaction information to a transaction database, c) generating a transaction validation reply, and d) generating a transaction validation request. The transaction information may be selected from the group consisting of a prize information, loyalty point information, an establishment, a location, a bar code, a instrument type, an issue date, a validation number, an issue time, an instrument number, an instrument sequence number and a machine number.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features and advantages of the invention will be spelled out in more detail below with reference to the associated drawings.

DESCRIPTION OF THE PREFERRED EMBODIMENTS

Concepts important to many embodiments of this invention include "loyalty points," "loyalty point sessions," and "loyalty points initiation events." Loyalty points refers to any type of points accrued for participating in designated activities at a gaming establishment. Such establishments include casinos, hotels where gaming activities are provided, stores where gaming activities are permitted, Internet-based gaming activities, and the like. Designated activities include, but are not limited to, gaming activity such as playing gaming machines, card games such as black jack, pai gow poker, baccarat and poker, betting on public event outcomes, table games such as roulette, craps, keno and lotteries, etc. Other patronage activities at gaming establishments may accrue loyalty points. As indicated above, loyalty points represent a form of credit accrued for patronage. The points can be redeemed for a variety of goods or services (or translated to other forms of credit) within a gaming establishment or affiliated establishment. Player tracking points are a typical example of "loyalty points."

Loyalty point sessions are sessions during which a person is performing the designated activity and during which loyalty points accrue. Such session may be delineated by a first event and a second event (such as the "game events" described above). Importantly, loyalty point sessions can be triggered or initiated by events that need not involve conventional player tracking initiation events (e.g., insertions of player tracking cards). Thus, the person can begin accruing loyalty points even if he/she forgets to insert his/her player tracking card or otherwise fails to initiate a conventional player tracking session. Further, it is possible that the entire process is performed anonymously so that the gaming establishment never knows who is accruing the loyalty points—or at least not via a conventional player tracking methodology.

Because loyalty points sessions may begin without a conventional player tracking initiation event, a more general concept must be applied to initiation of loyalty points sessions. Preferably such initiation can be automatically detected by a gaming machine or other mechanism at a gaming establishment. (Note however that some activities such as black jack may require that a dealer or other person manually initiate the session.) Examples of events that trigger accrual of loyalty points include a player beginning to play a particular gaming machine, a player providing cash or indicia of credit to a gaming machine, a user actuating a mechanism allowing anonymous gaming activity, etc. Examples of events that can indicate the end of a loyalty points session include winning a jackpot or other conventional gaming award, a user actuating a mechanism indicating an end to the gaming activity, detecting that a particular period of inactivity has elapsed, etc.

Figure 1:
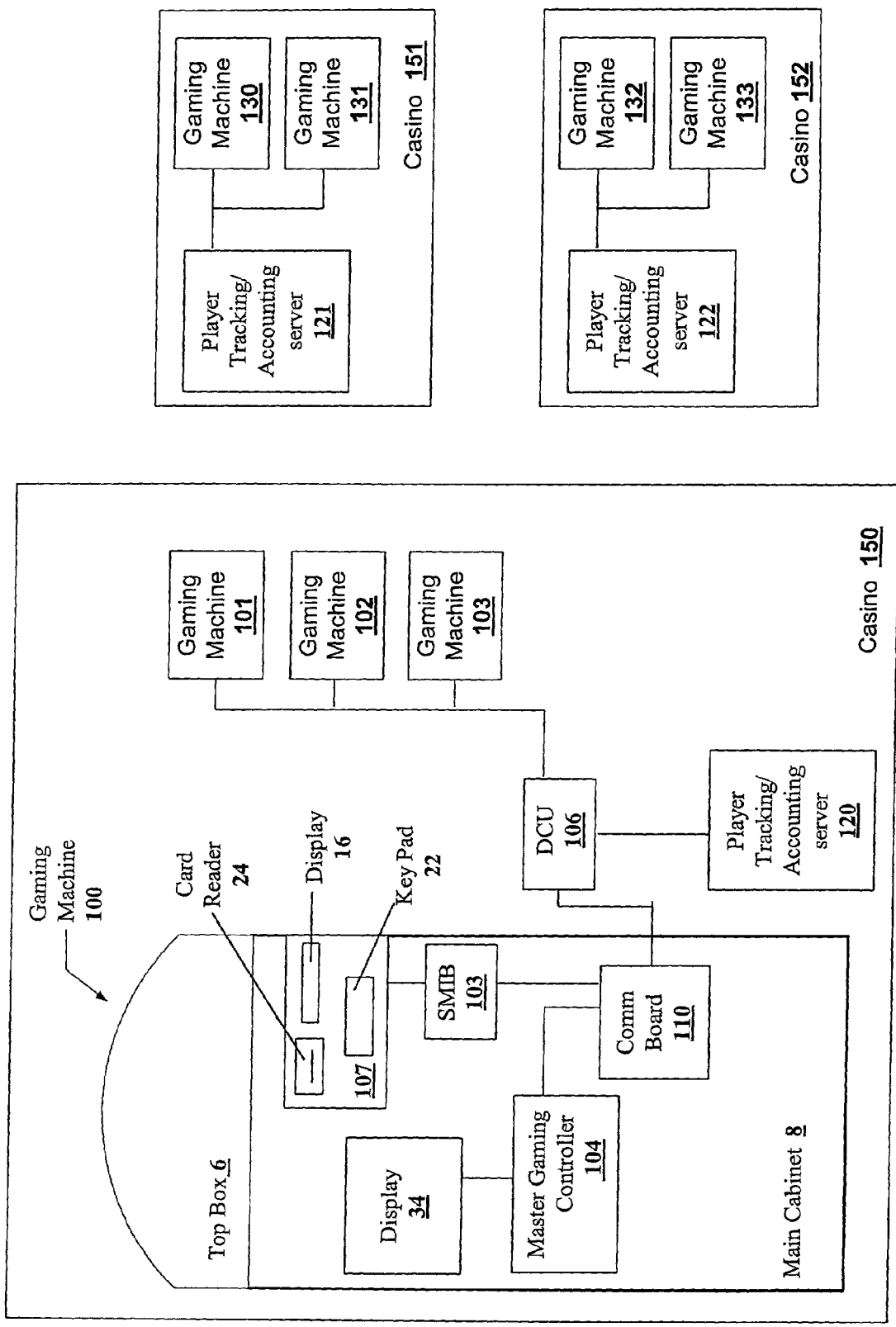
FIG. 1 is a block diagram of a number of gaming machines with player tracking units connected to servers providing player tracking services.
Figure 2:
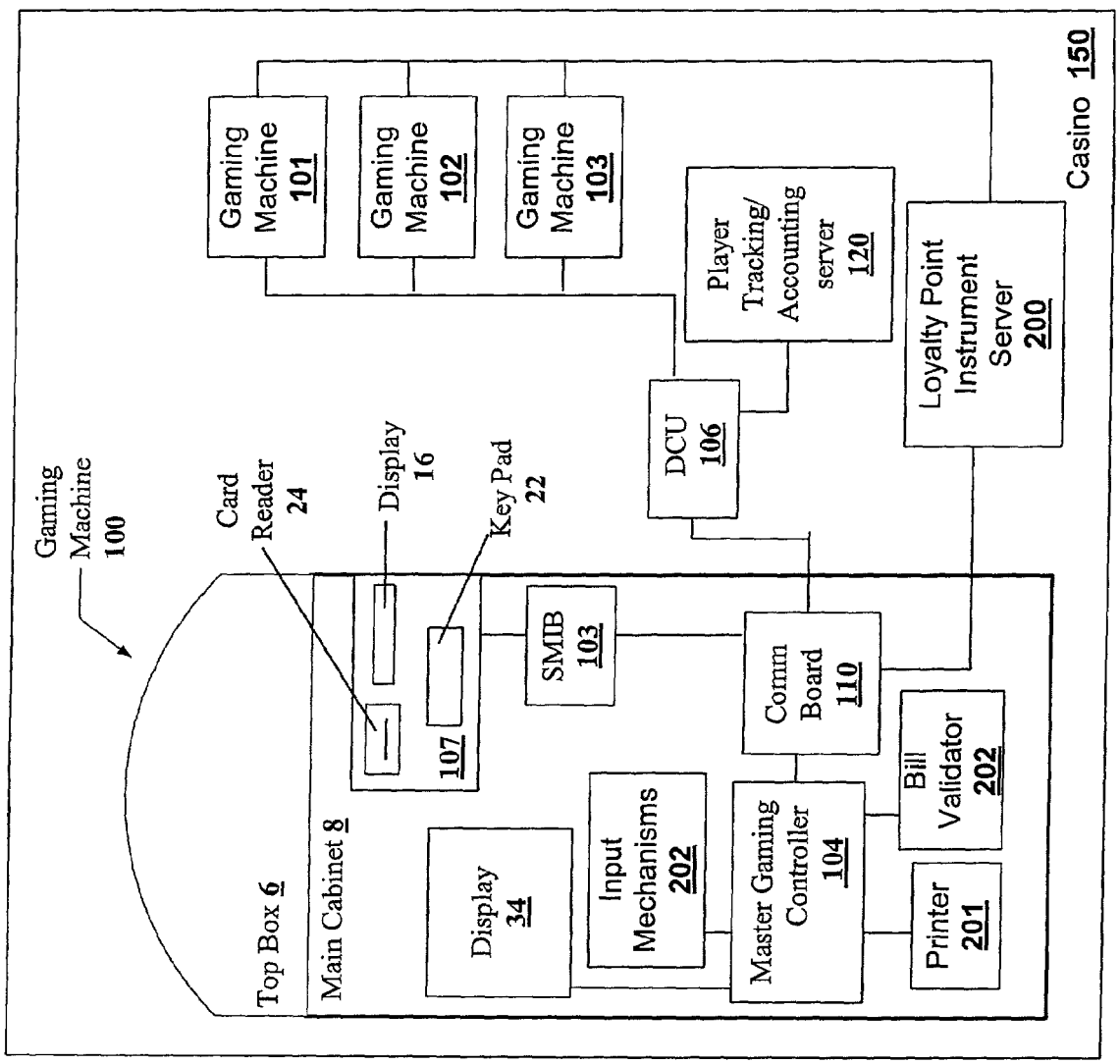
FIG. 2 is a block diagram of a gaming machine connected to a player tracking server and a loyalty program server allowing loyalty program instrument transactions.

FIG. 2 is a block diagram of gaming machines 100, 101, 102 and 103 connected to a player tracking server 120 and a loyalty program instrument server 200 allowing loyalty program instrument transactions. With the present invention, without providing a player tracking card, player tracking information or any other type of identification information, a player may initiate a game play session on gaming machine 100, play a number of games and receive loyalty points, such as player tracking points. The player may or may not have a player tracking account with the gaming establishment such as casino 150. Note that the "game play session" described here serves as an example of a loyalty points session.

For instance, the player may insert a bill or a bar-coded printed ticket (e.g. an EZPAY™ ticket) into bill validator 202 to register credits on the gaming machine. When credits are registered on the gaming machine 100, a logic device located on the gaming machine 100, such as master gaming controller 104 or a logic device located the player tracking unit 107, may begin to generate loyalty points, such as player tracking points. As another embodiment, when credits are registered on the gaming machine 100, a remote logic device such as a logic device on the player tracking accounting server 120 or a logic device on the loyalty program instrument server 200 may begin to accrue loyalty points. Next, the player, using input mechanisms 202, may make wagers on a number of games presented on the gaming machine and view the game outcomes on display 34. Based upon a manner in which the player participates in game play on the gaming machine 100, such as the amount wagered over a specific period of time, loyalty points may be awarded to the player. A rate at which the player accrues loyalty points may be adjusted according to the following parameters (without limitation thereto): 1) the time of the day, 2) the day of the week, 3) month of the year, 4) a total amount wagered, 5) an amount of time spent playing, 6) a game denomination, 7) a promotional event and 8) a game type.

The amount of loyalty points awarded to the game player is calculated by a logic device located on the gaming machine, by a remote gaming device or combinations thereof. When the logic device used to calculate the awarded loyalty points is located remotely, the master gaming controller 104 may transfer certain gaming machine information, such as wager amounts, to the remote logic device. For instance, when the player tracking account server 120 or the loyalty program server 200 calculates the amount of loyalty points awarded during a particular game play session, the master gaming controller 104 may sends game play information to these remote gaming devices. In some embodiments, game play information used to calculate loyalty point awards may be sent from the gaming machine to the player tracking server 120 through the player tracking unit 107 or the information may be sent directly to the loyalty program instrument server 200. In other embodiments, the master gaming controller 104 may calculate the loyalty points awarded during a game play session. Thus, the transfer of game play information to a remote gaming device may not be required.

At the end of the player's game play session, the amount of loyalty points awarded to the player may be stored on a loyalty point instrument such as a printed ticket, a smart card, a debit card, a room key or a portable wireless device. For example, the printer 201 may print a ticket voucher showing the amount of loyalty points awarded to the player during the game play session. The player may later validate the ticket to receive the loyalty points. As another example, loyalty points awarded to the player may be stored on a smart card inserted into the card reader 24. In some embodiments, the loyalty point instrument may simply be used as a receipt to ensure that loyalty point credits earned by the player have been correctly credited to their account.

When the loyalty point instrument is issued to the player, various types of transaction information may be recorded on the loyalty point instrument and may also be stored to another memory location on the gaming machine 100, on the loyalty program instrument server 120, on the player tracking server 120 or some other gaming device. Examples of stored transaction information includes an issue time, a date, an instrument number, an instrument type, a machine number, etc., The transaction information stored on the loyalty point instrument and stored at the additional memory location may be compared to validate the loyalty point instrument. For instance, a player may wish to have the loyalty points stored on the ticket voucher to be later credited to their player tracking account or to redeem the points directly for a goods and services item without crediting the player's player tracking account. In some cases, the player may not even have a player tracking account. To credit or to redeem the loyalty points stored on the loyalty point instrument, the transaction is first validated. Specific examples of the loyalty point instrument validation process and other uses of loyalty point instruments are described with respect to FIGS. 3-8.

An advantage of loyalty point instruments of the present invention is that a player may earn loyalty points such as player tracking points from game play on a gaming machine or during other gaming activities without the use of a player tracking card or without providing any identification information. As indicated above, if a player forgets to bring their player tracking card, loses their player tracking card, brings the wrong card, forgets to insert the card into the gaming machine, inserts the card incorrectly into the card reader or the card reader is malfunctioning, the player may be still earn loyalty points such as player tracking points from a game play on a gaming machine. In current player tracking programs, before a player can receive player tracking points, the player must always provide identification information of some type, which is usually stored on their player tracking card. Thus, in any situation where player tracking identification information is not provided by the player, such as in the cases described above where the information is obtained from a player tracking card, the player does not earn player tracking points. These situations are avoided with the present invention.

Figure 3:
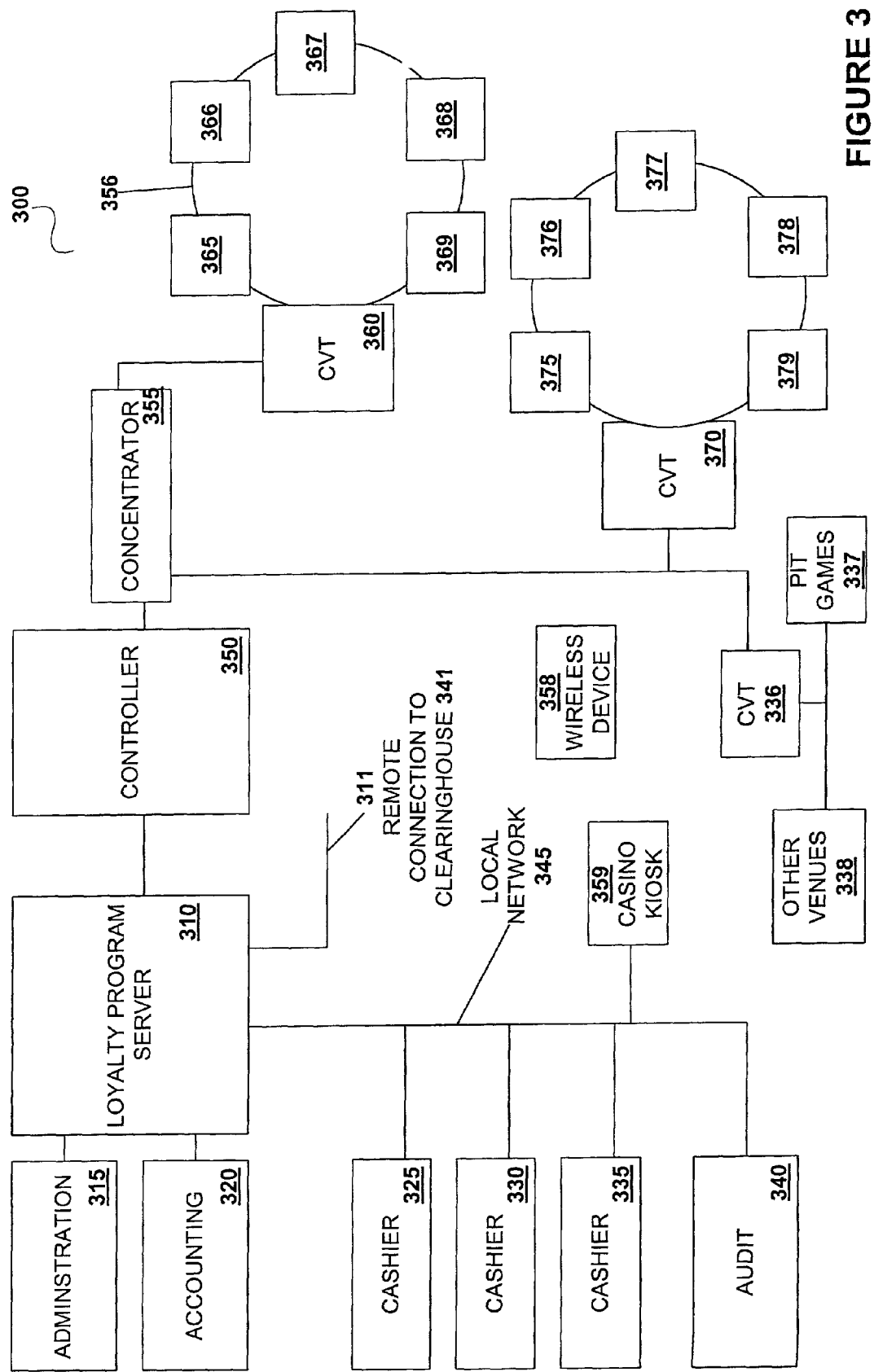
FIG. 3 is a block diagram of the components of a loyalty program instrument system for one embodiment of the present invention.

FIG. 3 is a block diagram of the components of a loyalty program instrument system for one embodiment of the present invention. A loyalty program instrument system is the hardware components and software components needed to generate and validate loyalty program instruments. Components of an loyalty program system may include 1) data acquisition hardware, 2) data storage hardware, 3) loyalty program instrument generation and validation hardware (e.g. printers, card readers, ticket acceptors, validation terminals, etc.), 3) auditing software, 4) loyalty program instrument validation software and 5) database software. Many types of loyalty program instrument systems are possible and are not limited to the components listed above. A loyalty program instrument system may be installed at each property utilizing loyalty program instruments. To allow multi-site validations of loyalty program instruments, the loyalty program instruments systems at each property may be linked to a loyalty program transaction clearinghouse. The relation of multiple loyalty program instrument systems connected to a loyalty program transaction clearinghouse are described with reference to FIGS. 4 and 5. The details of the generation and the validation of loyalty program instruments using a loyalty program instrument system at one property are described below with reference to FIG. 3.

In some embodiments of the present invention, the loyalty program instrument system may be implemented in conjunction with a cashless system that generates cashless instruments. Thus, a single instrument generation site may issue both cashless instruments and loyalty program instruments. For example, a gaming machine may issue printed tickets with a cash value that may be redeemed for cash or gaming credits as part of a cashless system or a gaming machine may issue printed tickets with a loyalty point value or a prize value that may be redeemed for goods and services as part of a loyalty program instrument system. Further, a single generation site may issue a plurality of different instrument types for cashless transaction and loyalty program transaction such as but not limited to smart cards, printed tickets, magnetic striped cards, room keys and portable wireless devices. In addition, a single validation site may accept and validate both cashless instruments and loyalty program instruments such as but not limited to smart cards, printed tickets, magnetic striped cards, room keys and portable wireless devices. An example of a cashless system that may be modified to implement both cashless instruments and loyalty point instruments with the present invention is the EZPAY™ system manufactured by IGT of Reno, Nev.

Details of apparatus and methods used to validate a cashless instruments and that may be applied to the validation of a loyalty point instruments are described in co-pending U.S. application Ser. No. 09/544,884 by Rowe et al. filed Mar. 7, 2000 entitled "Wireless Gaming Environment" which is incorporated herein in its entirety and for all purposes. Details of apparatus and methods used to validate a cashless instrument across multiple gaming properties and may be applied to the validation of a loyalty point instrument across multiple gaming properties are described in co-pending U.S. application Ser. No. 09/684,382 by Rowe filed Aug. 25, 2000 entitled "Cashless Transaction Clearinghouse" which is incorporated herein in its entirety and for all purposes. Details of apparatus and methods of using a smart card as a cashless instrument, at a single gaming property or across multiple gaming properties, that may be applied to the use of a smart card as a loyalty point instrument, at a single gaming property or across multiple gaming properties, are described in co-pending U.S. application Ser. No. 09/718,974 by Rowe filed Nov. 22, 2000 entitled "EZPAY™ Smart Card and Ticket System" which is incorporated herein in its entirety and for all purposes. Details of providing secure transactions for a cashless system which may applied to a loyalty program instrument system are described in co-pending U.S. application Ser. No. 09/660,984 by Espin et al. filed Sep. 13, 2000 entitled "Transaction Signature" which is incorporated herein in its entirety and for all purposes.

Returning to FIG. 3, a first group of gaming machines 365, 366, 367, 368, and 369 is shown connected to a first clerk validation terminal (CVT) 360 and a second group of gaming machines, 375, 376, 377, 378 and 379 is shown connected to a second CVT 370. The clerk validation terminals are used to store loyalty program transaction information generated when a loyalty program instrument is issued at a generation site such as a gaming machine. The loyalty program transaction information, which may be stored each time a loyalty program instrument is issued, may include but is not limited to prize information, loyalty point information, an establishment, a location, a bar code, a instrument type (e.g. ticket, smart card, room key, magnetic card, portable wireless device, etc.), an issue date, a validation number, an issue time, an instrument number, an instrument sequence number and a machine number. Also, the loyalty program transaction information may include transaction status information such as whether the loyalty program instrument has been validated, is outstanding or has expired. Some of the loyalty program transaction information stored in the CVT may also be stored on the loyalty program instrument as loyalty program instrument information. When a loyalty program instrument is validated, the information stored in the CVT and the information stored on the loyalty program instrument may be compared as a means of providing secure loyalty program transactions.

As described with reference to FIG. 2, all of the gaming machines are designed or configured to accrue loyalty points during a game play session, award a player some or all of the accrued loyalty points and store loyalty program information to a loyalty program instrument, such as a printed ticket, a magnetic striped card, a room key, a portable wireless device or a smart card, which is issued to the game player. The loyalty program instruments, as part of a loyalty program available at property 300, may be redeemed for goods and services. In addition, the gaming machines and other loyalty program validation sites at property 300 may accept loyalty program instruments issued at a different property from property 300 where the different property utilizes the same or a different loyalty program instrument system as compared to property 300. Details of a multi-site loyalty program instrument system are described with respect of FIGS. 6 and 7.

A player may participate in a number of activities at the gaming establishment of property 300 for which the player can earn loyalty points. For instance, loyalty points may be earned while playing a game of chance at pit games 337, while playing one of the gaming machines, or while making a food purchase, an entertainment purchase, a transportation purchase, a lodging purchase, a merchandise purchase or a service purchase at one of the other venues 338 at property 300. Further, food purchases, entertainment purchases, transportation purchases, lodging purchases, merchandise purchases and service purchases that earn loyalty points for a patron may be made at venues outside of traditional gaming establishments but in affiliation with a gaming establishment. For instance, a patron may make a food purchase at a restaurant affiliated with a gaming establishment or may make merchandise purchase with a retailer affiliated with the gaming establishment. After their purchase, the patron may be issued a loyalty point instrument with a number of loyalty points that may be redeemed for goods, services and comps or may be later added to a loyalty point account of the patron. Affiliated venues that issue loyalty point instruments may be linked to a loyalty program server, such as 310, via the Internet (see FIG. 7).

As another example, a player, without providing identification information such as player tracking information or comp information, may be identified at a pit game. After rating the players manner of game play over a certain period of time (e.g. amount bet), the player may be awarded a loyalty point instrument storing loyalty points, such as a printed ticket, earned during their pit game play. The loyalty point instrument may be later exchanged by the player for a comp, such as free meal at casino buffet. In another embodiment, when player comp information has been provided by the player, the loyalty point instrument may be used as a receipt that is designed to allow the player to verify that their game play has been both correctly rated and correctly entered into the comp system.

After each activity, a player may be issued 1) a new loyalty program instrument storing the loyalty points earned for the activity or 2) an existing loyalty program instrument may be updated to store additional loyalty points. For instance, the existing loyalty program instrument may be, a smart card, already storing loyalty points earned from previous activities. The smart card may be modified to store additional loyalty points after each new activity. Accumulated loyalty points earned by a player and stored on a loyalty program instrument may be used to obtain goods, services and comps at various loyalty program validation sites at property 300, such as but not limited to: i) gaming machines, ii) cashier stations 325, 330, 335, iii) a casino kiosk 359, iv) from a casino service person with a hand-held wireless device 358 and v) at a clerk validation terminal 360 or 370.

In general user interfaces for viewing and modifying loyalty point accounts may displayed on many different types of computing devices such as gaming machines, personal digital assistants, home computer linked to remote site via the Internet, a kiosk located in a casino, a phone and a video display interface. In one embodiment, a video display interface may be a television monitor located in a hotel room. The hotel rooms may be linked by a local intranet to the loyalty program server 310. A touch screen, control pad or some other input device may be used with the television monitor to provide input to the loyalty point account user interface.

A game player may wish to use a loyalty program instrument issued during one activity during another activity at property 300. For example, a game player may a participate in a pit game 337 such as craps, roulette, black jack, etc. and may be issued a loyalty point instrument, such as a printed ticket, with a number of loyalty points based upon the manner in which they participated in the activity such as an amount wagered over a particular amount of time. Next, the player may desire to use the loyalty point instrument during another activity such as a game play session on one of the gaming machines 365, 366, 367, 368, 369, 375, 376, 377, 378 and 379. After the loyalty point instrument has been validated, as described below, the loyalty points stored on the loyalty point instrument may be used by the player to redeem prizes, goods, or services available on the gaming machine. In one embodiment, for promotional purposes, only particular prizes, goods or services may be available on particular gaming machines to encourage game play of those machines. In another embodiment, a player may redeem loyalty points stored on a loyalty point instrument to access a special bonus features or game play features on a gaming machine. For example, after the play has been issued a printed ticket with loyalty points during one activity, the player may initiate a game play session on a gaming machine by entering the printed ticket into a bill validator on the gaming machine. After ticket has been validated, as described below, some or all of the loyalty points stored on the printed ticket may be used to access a special bonus game or a special game play feature available on the gaming machine such as a chance to win a special jackpot. For instance, a player may commit five hundred loyalty points earned from a lodging purchase, stored on a loyalty program instrument, to activate a bonus feature on a gaming machine.

In yet another embodiment, for convenience, a player may desire to combine loyalty points earned from a plurality of activities, such as gaming machine play, pit game play, merchandise purchases, etc., and stored on multiple loyalty program instruments onto a single loyalty program instrument. For example, a player may be issued a printed ticket or another type of loyalty program instrument from a gaming machine after a first game play session. At beginning of a second game play session, on the same or a different gaming machine, the player may insert the printed ticket into the gaming machine. After validating the ticket, the gaming machine may add any loyalty points stored on the ticket to any loyalty points earned by the player during the second game play session and issue a new loyalty point instrument, such as a printed ticket, with combined loyalty points.

Since loyalty points may be redeemed for goods and services, the loyalty points may be considered as having a "cash value" of some type. Thus, since the loyalty points have a "cash value", it is important to prevent fraud, such as validating a single ticket multiple times or validating a duplicate copy of an already validated ticket, and to provide accounting means for tracking unvalidated and validated tickets. To prevent fraud and to provide accounting for loyalty program instruments, generation sites and validation sites for loyalty point instruments, such as but not limited gaming machines, casino kiosks, cashier stations, clerk validation terminals, pit games and wireless gaming devices, may 1) when a loyalty program instrument is generated at generation site, store loyalty program transaction information to both the loyalty program instrument and to a memory location separate from the loyalty program instrument and 2) when a loyalty program instrument is validated, loyalty program transaction information stored on the loyalty program instrument may be compared with loyalty program transaction information previously stored at the memory location.

In one embodiment of the present invention, a clerk validation terminal (CVT), such as 336, 360 and 370, may be connected to a number of gaming devices that generate loyalty program instruments and the CVT may store loyalty program transaction information each time a loyalty program instrument is generated by one of the gaming devices connected to the CVTs issues a loyalty point instrument. For instant, CVT 360 is connected to gaming machines, 365, 366, 367, 368 and 369 in ring 356. The gaming machines 365, 366, 367, 368 and 369 may issue printed tickets as a loyalty program instrument. Each time one of the gaming machines issues a printed ticket, loyalty program transaction information describing the loyalty program transaction may be stored to the CVT and printed on the ticket.

When the CVTs are not connected to one another or the gaming machines are not linked together in some manner, a loyalty program instrument from one gaming machine may be only be accepted in another gaming machine which is in a group of gaming machines connected to the same clerk validation terminal. For example, a loyalty program instrument issued from gaming machine 365 might be accepted at gaming machines 366, 367, 368 and 369, which are each connected to the CVT 360, but not in gaming machines 375, 376, 377, 378, and 379, which are each connected to the CVT 370. In an analogous manner, when the cashless systems from one property are not connected together then a loyalty program instrument generated from gaming machine 366 may be not be used at property different from property 300.

The CVTs, 336, 360 and 370, store loyalty instrument transaction information corresponding to the outstanding loyalty program instruments, including ticket vouchers, smart cards and debit cards, that are waiting for redemption. The CVTs may also store cashless instrument transaction information. In this embodiment, the CVTs are separate from the gaming machine. However, the loyalty program transaction information may be also be stored within each gaming machine or one gaming machine may functionally act as a CVT for a group of gaming machines eliminating the need for separate CVT hardware. In addition, loyalty program transaction information may be stored in a loyalty program server 310. As previously described, the loyalty program server may be an EZPAY™ server that also supports cashless instrument transactions.

As described above, the loyalty program transaction information may be used when the loyalty program instruments are validated in some manner such as for a prize redemption or to credit the points to a loyalty point account. The CVTs 336, 360 and 370 may store the information for the ticket vouchers printed by the gaming machines connected to the CVT. For example, CVT 360 stores ticket voucher information for ticket vouchers printed by gaming machines 365, 366, 367, 368, and 369. When a ticket is printed out or a loyalty point instrument is issued in some other manner, loyalty program transaction information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In present invention, when a player wishes to redeem a ticket or a loyalty program instrument of some other type, the player may redeem vouchers printed from a particular gaming machine at the CVT associated with the gaming machine or any other CVT which is part of the loyalty program instrument system associated with the CVT. For example, since CVT 360 and CVT 370 are connected as part of a single cashless system to the EZ pay server 310, a player may redeem loyalty program instruments or utilize loyalty program instruments at the gaming machines, the CVT's (336, 360 or 370), the cashiers (325, 330 and 335), the casino kiosk 359, the other venues 338 or the wireless cashiers 358. To redeem a loyalty program instrument, the loyalty program instrument is validated by comparing information obtained from the instrument with information stored within the CVT or other gaming devices which behaves functionally as a CVT. After the loyalty program instrument has been redeemed, the CVT marks the instrument paid in a database to prevent an instrument with similar information from being cashed multiple times.

Again, not all loyalty program systems may utilize CVTs, many of the functions of the CVT may be transferred to the cashless server, including the loyalty program server 310, eliminating the transferred function within the CVT. For instance, the cashless instrument transaction information may be stored in the loyalty program server 310 instead of the CVTs. Thus, the need to store loyalty program transaction information within the CVT may be eliminated.

In this embodiment, multiple groups of gaming machines connected to CVTs, such as 355 and 370, and other gaming devices in the other venues 338 and the pit games 337 connected to CVT 336 are linked together in a cross validation network 345. The cross validation network is typically comprised of one or more concentrators 355 which accepts inputs from two or more CVTs and enables communications to and from the two or more CVTs using one communication line. The concentrator 355 is connected to a front end controller 350 which may poll the CVTs for loyalty program transaction information. The front end controller 350 is connected to an Loyalty Program server 310 which may provide a variety of information services for the loyalty program instrument system including accounting 320, administration 315 and loyalty program account maintenance.

In this invention, the loyalty program server is a hardware and a software platform allowing loyalty program instruments to be utilized at all of the loyalty program validation sites (e.g. cashier stations, gaming machines, wireless cashiers and CVTs) within the single property 300. The loyalty program server 310 may also be used to provide multi-site validation of loyalty program instruments via a connection 311 such as a network interface to a remote loyalty program transaction clearinghouse. The loyalty program server is a communication nexus in the cross validation network. For instance, the loyalty program server 310 is connected to the cashiers, wireless devices, remote cashless instrument transaction clearinghouse, CVTs and the gaming machines and other gaming devices via the CVTs.

The cross validation network allows loyalty program instruments generated by any gaming machine connected to the cross validation network to be accepted by other gaming machines in the cross validation network 345. Additionally, the cross validation network allows a cashier at a cashier station 325, 330, and 335 to validate any ticket voucher generated from a gaming machine within the cross validation network 345. As an example, to redeem a loyalty program instrument for goods and services, a player may present the instrument at one of the cashier stations 325, 330, and 335, the casino kiosk 359 or to a game service representative carrying a wireless gaming device 358 for validating loyalty program instruments. Loyalty program transaction information obtained from the instrument is used to validate the instrument by comparing information on the instrument with information stored on one of the CVTs connected to the cross validation network. In addition, when the loyalty program instrument was issued at another property, the information on the instrument may be stored at the other property. Thus, to validate the loyalty program instrument, the loyalty program server 310 may have to communicate with the loyalty program transaction clearinghouse 341 via the remote connection 311 to obtain the information necessary to validate the instrument.

As loyalty program instruments are validated, this information may be sent to audit services computer 340 providing audit services, the accounting computer 320 providing accounting services or the administration computer 315 providing administration services. In another embodiment, all of these services may be provided by loyalty program server 310 which may also be an EZPAY™ server. Examples of auditing services, which may be provided by loyalty program system software residing on the auditing computer 340 include 1) session reconciliation reports, 2) soft count reports, 3) soft count verification reports, 4) soft count exception reports, 5) machine instrument status reports and 5) security access report. Examples of accounting services, which may be provided by cashless system software residing on the accounting computer 320 include a) instrument issuance reports, b) instrument liability reports, expired instrument reports, c) expired instrument validation reports and d) instrument redemption reports. Examples of administration services, which may be provided by loyalty program system software residing on the administration computer 315 include i) manual loyalty program instrument receipt, ii) manual loyalty program instrument report, iii) loyalty program instrument validation report, iv) interim validation report, v) validation window closer report, vi) voided loyalty program instrument receipt and vii) voided loyalty program instrument report.

In another embodiment of the present invention, two or more gaming machines, such as 365, 366, 367, 368 and 369, may be linked together to allow loyalty points earned during the simultaneous game play of the two or more linked gaming machines to be combined on a single loyalty point instrument. Thus, a single game player playing two or more linked gaming machines simultaneously or a couple playing two or more linked gaming machines simultaneously may be able to receive a single loyalty point instrument issued from one of the linked gaming machines for their game play on all of the linked gaming machines. In another embodiment, based upon the combined amount of game play for two or more gaming machines linked together, the rate of loyalty points accrued may be increased. Thus, a couple playing together on two or more linked gaming machines simultaneously or a single person playing two or more linked gaming machines simultaneously may be able to earn more loyalty points than when playing on two or more non-linked gaming machines simultaneously.

Figure 4:
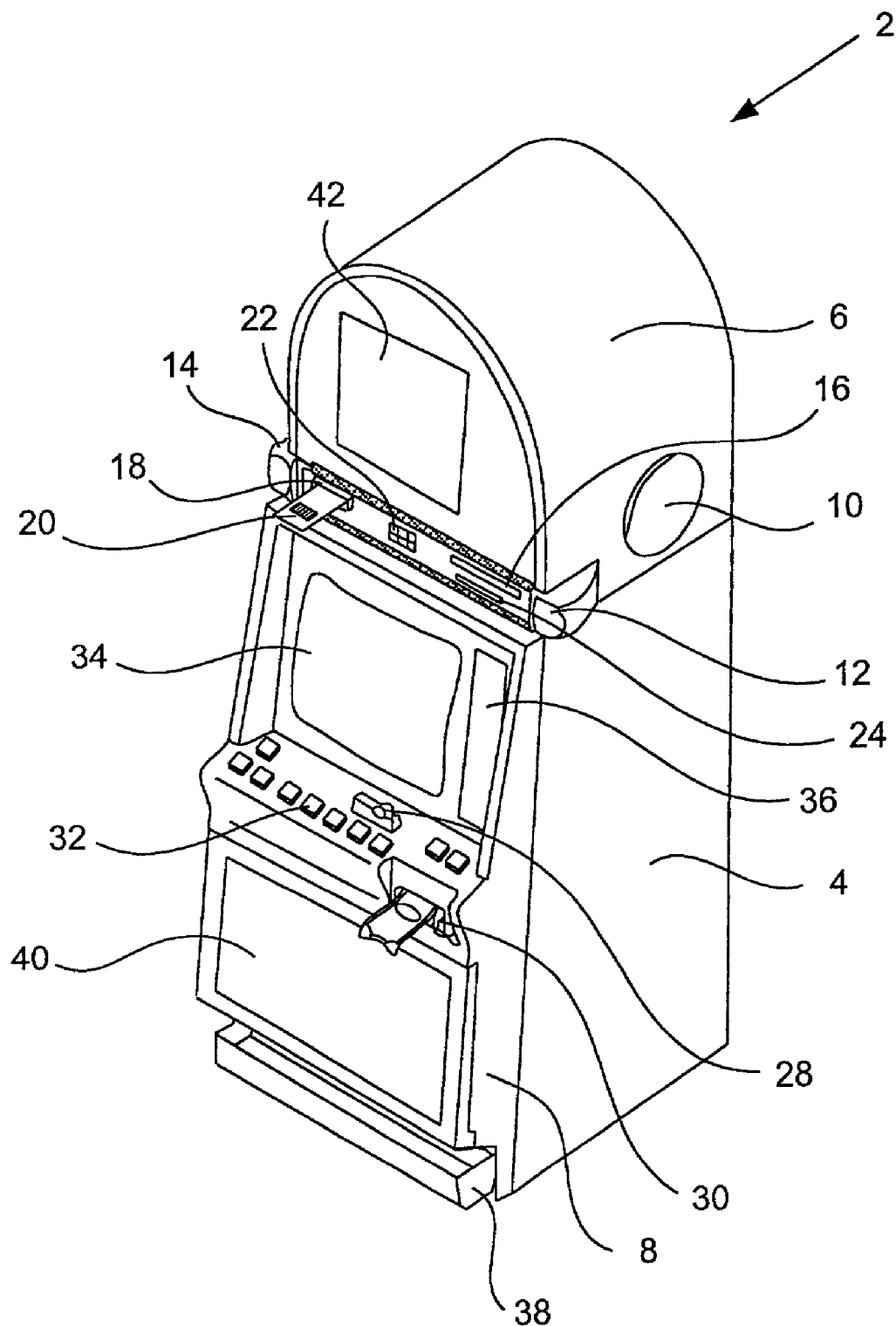
FIG. 4 is a perspective drawing of a video gaming machine of the present invention.

Turning to FIG. 4, more details of using loyalty program instruments in the context of game play on a gaming machine are described. In FIG. 4, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 2) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as loyalty point instruments or cashless instruments, a key pad 22 for entering player tracking information, a florescent display 16 for displaying player tracking information, a card reader 24 for entering a magnetic striped card containing player tracking information. Further, the top box 6 may house different or additional devices than shown in FIG. 4. For example, the top box may contain a bonus wheel or a back-lit silk screened panel which may be used to add bonus features to the game being played on the gaming machine. During a game, these devices are controlled and powered, in part, by circuitry, such as a master gaming controller, (See FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicia of credit. As another example, the card reader 24 may accept a debit card or a smart card containing cash or credit information that may be used to register credits on the gaming machine. In addition, the player may use a loyalty program instrument, such as smart card, ticket voucher, or debit card, to register previously accumulated loyalty points on the gaming machine. Typically, the information contained on the cashless instrument or loyalty point instrument, including the ticket voucher, smart card or debit card, is validated by a cashless system or loyalty program system. As described above, the cashless system and loyalty program may be a single or separate systems in the present invention. The loyalty program instrument, including but not limited to a ticket voucher, smart card or debit card, may have been generated at the same property, for example a first casino where the gaming machine 2 is located or the instrument may have been generated at another property for example a second casino.

As described above, on a gaming machine, loyalty points may redeemed for a number of purposes such as to access a special bonus feature available on the gaming machine or to obtain goods and services. The loyalty program instrument typically contains information used to register loyalty points on the gaming machine, including gaming machine 2, and validate the registration transaction. For example, when a ticket voucher is used as a loyalty program instrument, the printed ticket voucher may contain information including but not limited to: 1) a ticket value, 2) a ticket issue date, 3) a ticket issue time, 4) a ticket transaction number, 5) a machine ID, 6) a ticket issue location and 7) a ticket sequence number. Information such as the ticket value, the ticket issue date, the ticket issue time, the ticket number and the machine ID may be common to loyalty program systems that generate and validate tickets issued at a single property. However, information such as the ticket issue location and other information may be needed to allow multi-site generation and validation of loyalty program instruments. In addition, other types of information, besides the information listed above, may be stored on the loyalty program instrument. For example, the ticket may contain information regarding a promotional prize that may be redeemed for loyalty points by the player when the ticket voucher is utilized in the gaming machine 2. As another example, the ticket may contain information such as a number of additional loyalty points that are needed to obtain a particular goods or services item.

The information on the loyalty program instrument may be recorded on the loyalty program instrument when the loyalty instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 20, may be printed from a printer, including printer 18. In the case of the smart card or debit card, the generation of the smart card or debit card refers to storing or encoding this information on the smart card or debit card. The generation of the debit card or smart card may occur when the smart card or debit card is inserted into the card reader 24 in the gaming machine 2 or at another site where smart cards or debit cards are issued. For example, smart cards or debit cards may be generated at ATM like terminals, at a cashier station when a player cashes out or prepaid smart cards or debits may be purchased within the gaming property (e.g. casino). As another example, the gaming machine may transfer loyalty point information to portable wireless device worn by the player via a wireless interface (not shown) on the gaming machine 2. After game play session where an amount of loyalty points have been awarded to the player, the amount of loyalty points awarded to the player and any other loyalty points input into the gaming machine may be downloaded to the portable wireless device worn by the player via the wireless interface.

A game play session where loyalty points are accrued by the master gaming controller on gaming machine 2 or by another logic device located on the gaming machine 2 may occur after a particular game event initiated by a game player. For example, a loyalty point session, where loyalty points are accrued, may be triggered by one or more of the following game events: a) depositing an indicia of credit into the gaming machine [e.g., inserting a cashless instrument into the card reader 24], b) inserting a bill or a cashless instrument into the bill validator 30, or inserting a coin in the coin acceptor 28, c) activating an input button on the gaming machine [e.g., input buttons 32], d) inputting a loyalty program instrument into a gaming device on the gaming machine [e.g. inserting an instrument in the bill validator 30 or the card reader 24], e) entering a code into the gaming machine [e.g., via the key pad 22 or via a touch screen] and f) combinations thereof. In the present invention, when the gaming machine has not received identification information from the gaming player, such as but not limited to a player tracking account information, loyalty points may be still be accrued during the game play session. The game play session where loyalty points are accrued may end following another game event such as but not limited to i) detecting zero credits registered on the gaming machine, ii) the gaming machine remaining idle for an amount of time, iii) detecting a tilt condition or detecting an error condition on the gaming machine, iv) detecting a game player's request for a loyalty program instrument and v) combinations thereof. After the loyalty point session ends, some or all of the loyalty points accrued during the session may be awarded to the game player. The loyalty points may be awarded to the player by storing the points to a loyalty program instrument which is issued to the player or the awarded points may be credited to the player's player tracking account after the player provides identification information to the gaming machine.

During the course of a game play session, a player may be required to make a number of decisions, which affect the outcome of one or more games played during the game play session. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40.

After the player has completed a game play session, a loyalty program instrument or cashless instrument may be generated at the gaming machine 2. The loyalty program instrument or cashless instrument may be a printed ticket voucher, a smart card, debit card or other cashless medium. Prior to issuing the instrument, the loyalty points awarded to the player may be displayed on the main display 34, the secondary display 42 or the player tracking display 16. Also, a prize menu may be displayed on one or more displays on the gaming machine 2 such as the main display 34, the secondary display 42 or the player tracking display 16. The prize menu may include one or more goods and services items. To redeem a particular prize, a particular amount of loyalty points is needed. As service items, the game player may be able to convert the awarded loyalty points to frequent flyer miles, obtain a free meal with the loyalty points or obtain a free nights lodging with the loyalty points. As an example of goods items, a player may be able to redeem loyalty points for clothes, food items, electronic goods, etc.

In some embodiments, the player may be transfer the awarded loyalty points to a player tracking account. After providing account information (e.g., by inserting a player tracking card), the player tracking points may be transferred to a player tracking account of the player directly on the gaming machine (see FIG. 5). In other embodiments, the player may credit player tracking points or loyalty points, stored on a loyalty point instrument, to a player tracking account 1) over the phone, 2) at a clerk validation terminal, 3) at a cashier station, 4) at a casino kiosk, 5) via a web-interface, 6) via mail or 7) through a hand-held wireless device.

The game player may select one of the goods and services items from the prize menu using an input mechanism of some type. For instance, the prize menu may be displayed on a touch screen and the player may touch the screen to select one of the goods and services items. When the amount of loyalty points required to redeem the selected prize is less than an amount of loyalty points available on the gaming machine, a loyalty program instrument containing the prize instrument may be issued. For instance, when loyalty points are redeemed for a free meal, the player may be issued a ticket 22 from printer 18 which may be used to obtain a free meal when presented at one or more restaurants listed on the ticket.

In some embodiments of the present invention loyalty points accrued during the game play session may be combined with previously earned loyalty points to redeem a prize. Thus, loyalty points stored in one or more of a player's loyalty program accounts, such as a player tracking account, or loyalty points earned during other activities stored on one or more loyalty program instruments available to the player may be used to redeem prizes on the gaming machine. For instance, the player may insert five printed tickets containing various amounts of loyalty points into the gaming machine 2 using the bill validator 30. After each ticket has been validated, as described with reference to FIG. 3, the loyalty points stored on each ticket may be added to the amount loyalty points available on the gaming machine. As another example, the player may request that loyalty points be deducted from a loyalty program account such as a player tracking account. In this case, the gaming machine may send a message to remote server storing the loyalty point account information and request that some amount of loyalty points be deducted from the player's account. Assuming the amount of requested points is available, the requested points may be deducted from the player's account and then transferred to the gaining machine. Finally, the method described above, may be implemented when the player has not accrued any loyalty points during a particular game playing session. For instance, the player may desire to redeem a prize using one or more loyalty program instruments storing loyalty points previously earned by the game player.

In another embodiment of the present invention, a single instrument may store both cash transaction information and loyalty program information. For instance, a smart card may be used to load credits onto a gaming machine and cash out an award from the gaming machine. Also, the smart card may be used to store loyalty program information generated during one or more of a player's game playing activities. Further, the smart card may store prize information for a prize redeemed at a gaming machine using loyalty points accrued by the game player.

Figure 5:
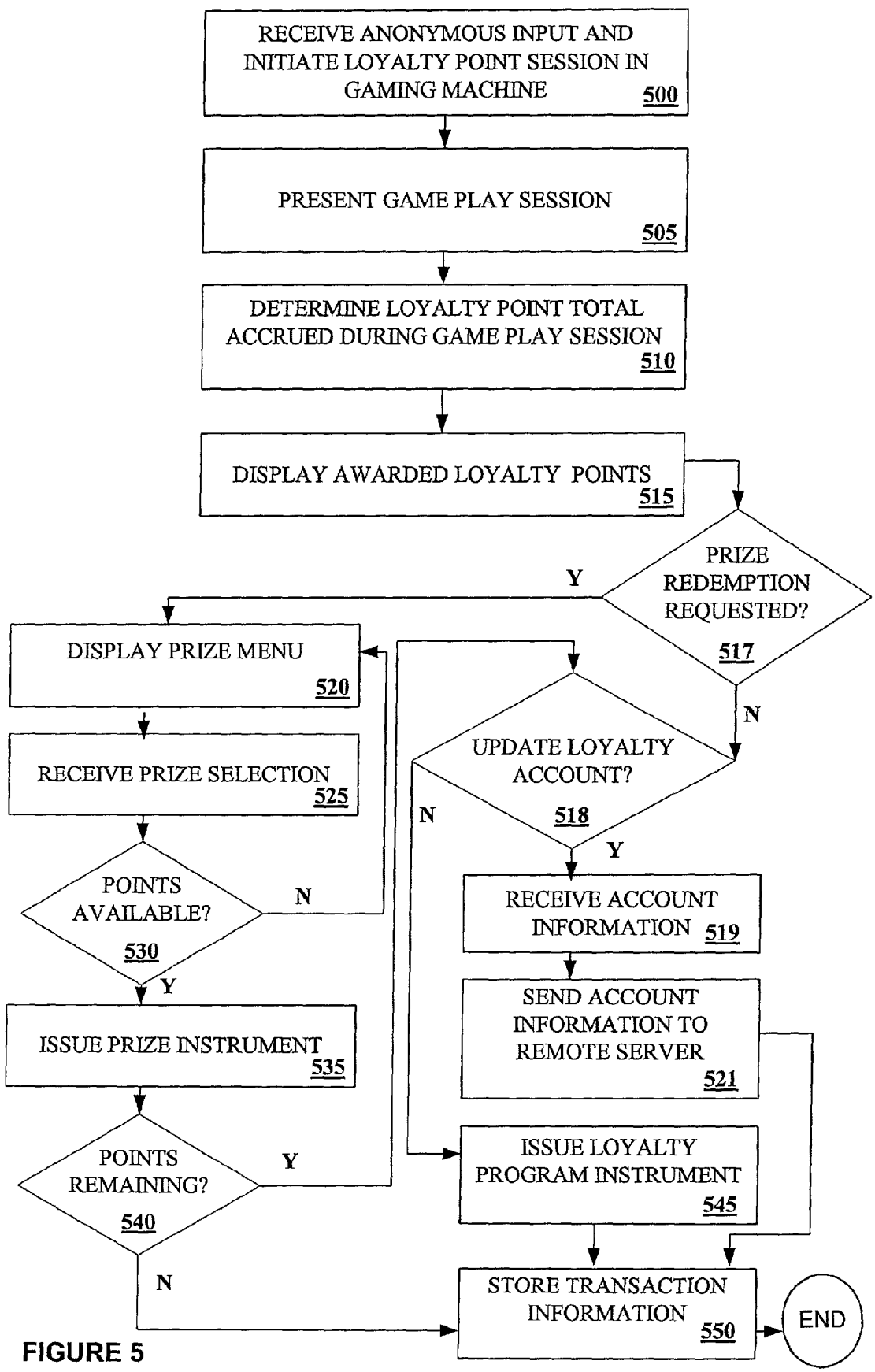
FIG. 5 is a flow chart depicting a method of rewarding loyalty points accrued anonymously on a gaming machine.

FIG. 5 is a flow chart depicting a method of rewarding loyalty points accrued anonymously on a gaming machine. In

500, a gaming machine receives an input of some type from a game player that has not provided any identification information, such as player tracking information. The input, which may be a number of different gaming events, as described with reference to FIG. 4, such as the player depositing a indicia of credit into the gaming machine, triggers a game play session on the gaming machine where loyalty points may be accrued. In 505, a game play session is presented on the gaming machine which may include the player wagering on a number of different games of chance and game outcome presentation corresponding to each wager. For instance, the player may make 5 different wagers on 5 slot games presented on the gaming machine. In 510, a gaming event triggers the end of the game play session and an amount of loyalty points accrued during the game play session are determined. The gaming event ending the game play session may be but is not limited to 1) detecting zero credits registered on the gaming machine, 2) the gaming machine remaining idle for an amount of time, 3) detecting a tilt condition or detecting an error condition on the gaming machine, and 4) detecting a game player's request for a loyalty program instrument. A rate at which the player accrues loyalty points during the game play session may vary according to one or more of a time of day, days of a week, months of a year, an amount wagered, a game denomination, a promotional event, a game type and a rate of wagering. After the amount of loyalty points accrued during the game play session have been determined, some or all of the accrued loyalty points may be awarded to the game player. For instance, a player that does not have a loyalty program account may be awarded a higher fraction of the accrued points than a player that already has an account to encourage the player without an account to sign up for a new account.

In 515, the gaming machine may display the amount of loyalty points accrued during the game play session to one or more display screens on the gaming machine (see FIG. 4). In 517, the player may be offered the option to exchange loyalty points for a prize of some type such as goods or services. In 520, when a prize redemption is requested, a prize menu may be displayed to one or more display screens on the gaming machine. The prize menu may contain a list of prizes available and a number of loyalty points corresponding to each prize that must be redeemed to obtain each prize. In 525, a player may select a prize. In 530, when the player does not have enough loyalty points available to obtain the prize, the prize menu in 520 may be redisplayed and the player may be asked to make another selection or given an option to exit from the menu.

In one embodiment, the player may be given the option (not shown) of viewing loyalty point account information from a loyalty point account such as a player tracking account available to the player. In this case, the player may enter loyalty program account information into the gaming machine using some method. For example, the game player may insert a player tracking card into a card reader on the gaming machine and type in an identification number corresponding to the card such as a PIN number. When the card has been validated, the player may view player tracking account information. Next, to redeem a prize requiring a certain number of loyalty points, when a player does not have enough loyalty points available on the gaming machine, the player may request that loyalty points be transferred to the gaming machine from a remote loyalty point account. The gaming machine may send a request for an amount of loyalty points to a remote server. When the loyalty point transaction has been approved, the remote server may send the requested loyalty points to the gaming machine and delete the requested points from the player's account. Then, the transferred loyalty points may be added to loyalty points already available on the gaming machine and used to redeem a prize.

In 535, when a prize selection has been made and there are enough loyalty points available on the gaming machine to redeem the prize, a prize instrument may be issued to the game player. For instance, the gaming machine may print a ticket for a free meal at a restaurant. The issued ticket may be taken to a restaurant and, after the ticket has been validated, used to obtain a free meal.

In 540, after a prize redemption and points are still remaining, the player may be given the option, in 518, of updating a remote loyalty account with the remaining points. When a player does not request a prize redemption, the player may be directly presented the option to update a remote loyalty point account with some or all of the points awarded during the game play session. In 519, the player may enter loyalty program account information into the gaming machine using some method. For example, the game player may insert a player tracking card into a card reader on the gaming machine and type in an identification number corresponding to the card such as a PIN number. In 521, when the loyalty program account information has been validated by the remote server, the gaming machine may send a request to the remote server requesting that an amount of loyalty points awarded to the player be added to the player's loyalty program account.

In 545, when loyalty points remain on the gaming machine, the gaming machine may issue a loyalty point instrument storing the remaining loyalty points. For instance, the gaming machine may issue a printed ticket voucher redeemable for a certain amount of loyalty points. In 550, the gaming machine may store to a local database residing on the gaming machine loyalty program transaction information for one or more loyalty program transactions performed by the gaming machine such as but not limited to 1) loyalty point awards, 2) prize redemptions, 3) requests for loyalty program account information, 4) requests to add loyalty points to remote account, 5) requests to delete loyalty points from a remote account and 6) information regarding issued loyalty point instruments. In 550, loyalty program transaction information may also be sent to a remote server in lieu of storing the information on the gaming machine or in conjunction with storing the information on the gaming machine.

Figure 6:
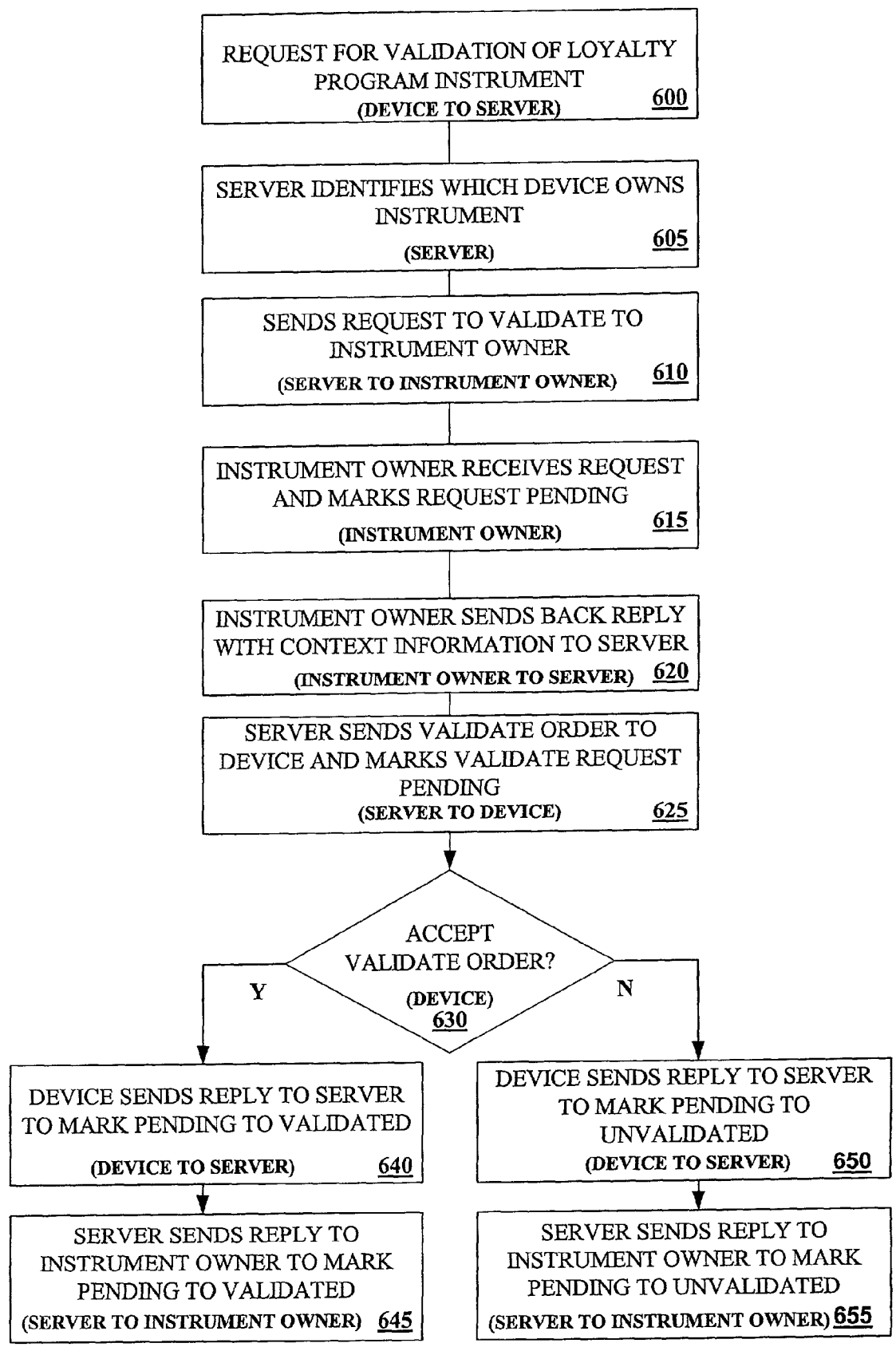
FIG. 6 is a flow chart depicting a method for validating information stored on a loyalty point instrument at a validation site connected to a cross validation network as described with reference to FIG. 3.

FIG. 6 is a flow chart depicting a method for validating information stored on a loyalty point instrument at a validation site connected to a cross validation network as described with reference to FIG. 3. In the embodiment shown in the figure, a loyalty point instrument is validated in a manner consistent with an EZPAY™ cashless system. In 600, a request for game service transaction information read from a loyalty point instrument is sent via a network interface on the gaming device validating the instrument to a loyalty program server. The gaming device may be a gaming machine, a casino kiosk, a hand-held wireless device or a CVT. In 605, the server identifies which gaming device owns the instrument. When a gaming device owns an instrument, the gaming device has stored information regarding the status of a particular instrument issued from a instrument generation site connected to the gaming device. As an example, as described with reference to FIG. 3, the gaming device may be a CVT connected to a number of gaming machines that generate loyalty program instruments. In 610, the server sends a request to validate the instrument to the gaming device identified as the owner of the instrument. Typically, the validation request indicates a service on the instrument has been requested. For instance, for a loyalty program ticket, a validation request may mean a request to access the loyalty points stored on the ticket has been made. For a loyalty program ticket valid for a free meal, a validation request may mean a request to obtain the meal has been made. In 615, the instrument owner receives the validation request for the instrument and marks the instrument transaction pending. While the instrument transaction is pending, any attempts to validate a loyalty program instrument with similar information is blocked by the instrument owner.

In 620, the instrument owner sends back a reply with context information to the server. As an example, the context information may be the time and place when the instrument was issued. The information from the instrument owner to the server may be sent as one or more date packets according to a communication standard shared by the instrument owner and server. In 625, after receiving the validation reply from the instrument owner, the server marks the validation request pending and sends a validation order to the gaming device validating the instrument. While the validation request is pending, the server will not allow another instrument with the same information as the instrument with the validation request pending to be validated.

In 630, the gaming device may chose to accept or reject the validation order from the server. For instance, using a security protocol, the gaming device may determine the validation order is invalid. As another example, an employee using a gaming device to validate loyalty program instruments may decide not to validate an instrument for some reason. When the gaming device accepts the validation order from the server, in 640, the gaming device sends a reply to the transaction server confirming that the transaction has been performed. The loyalty program server marks the request validated or completed which prevents another instrument with identical information from being validated. In 645, the server sends a confirmation to the instrument owner which allows the instrument owner to mark the request from pending to validated. When the gaming device rejects the validation order from the server, in 650, the gaming device sends a reply to the server to mark the validation request from pending to unvalidated. When the instrument transaction is marked unvalidated, it may be validated by another gaming device at a later time. In 655, the server sends the reply to the instrument transaction owner to mark the validation request from pending to unvalidated which allows the instrument to be validated later.

Figure 7:
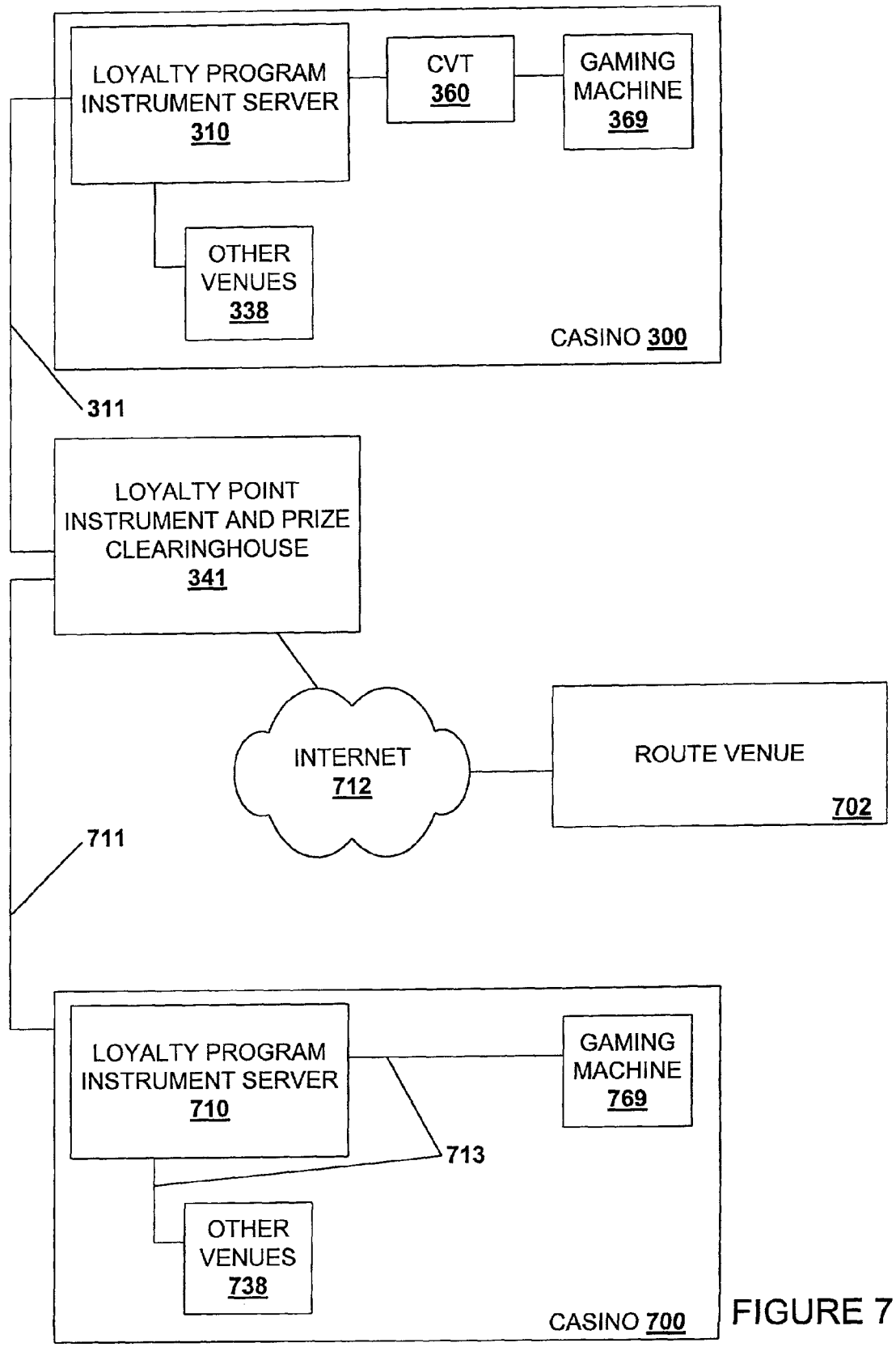
FIG. 7 is a block diagram of loyalty program systems at multiple gaming properties connected to a loyalty program transaction clearinghouse server.

FIG. 7 is a block diagram of loyalty program systems at multiple gaming properties connected to a loyalty program transaction clearinghouse server. At least three gaming devices, a loyalty program server 310 at property 300 (described with reference to FIG. 3), a loyalty program server 710 at property 700 and one or more gaming devices along a route venue 702, may communicate with the loyalty program transaction clearing house server 341. The route may comprise a plurality of gaming machines or other devices issuing loyalty program instruments located in various venues such as stores and bars. The example is for illustrative purposes only, as many different combinations of gaming devices using different network topologies may be connected to the loyalty point instrument and prize clearinghouse 341. At property 300, one or more gaming machines, such as gaming machine 369, send loyalty program transaction information to the clerk validation terminal 360. The CVT 360 sends information to the loyalty program server 310 which may also be cashless server and data acquisition system. In this embodiment, the functions of the controller 350 and concentrator 355, as described with reference to FIG. 3, are combined into the loyalty program server 310. The loyalty point instruments used on property 300 may be smart cards, magnetic cards, ticket vouchers, room keys, debit cards, portable wireless devices and combinations thereof.

The loyalty program server 310 contains a network interface used to send information on loyalty point instruments generated on property 300 to the clearinghouse server 341 or request information 300 from the clearinghouse server 341 on loyalty point instruments issued at other properties that are being validated at property, including instruments issued at property 700 and venues along route 702. The loyalty program transaction information sent to the loyalty program server 310 from the clearinghouse server 341 and received by the clearinghouse server from the loyalty program server 310 is transmitted via the network connection 311. Further, details of information transmitted between a cashless server and a cashless clearinghouse server in regards to multi-property cashless instrument validation as well as server hardware, which may be applicable to multi-property loyalty program instrument validation, are described in U.S. application Ser. No. 09/684,382 by Rowe filed Aug. 25, 2000 entitled "Cashless Transaction Clearinghouse."

At property 700 gaming machines, such as gaming machine 769, and other gaming devices located at other venues 738, such as a loyalty point instrument generation site at a pit game, are connected to the loyalty program server and data acquisition system 710 via the local network 712. The local network 712 may be a wireless or wired connection system including fiber, copper or wireless cellular, combinations of all three or other connection systems. A separate CVT is not shown in this embodiment. The functions of the CVT including storage of loyalty program transaction information may be built into one or more the gaming machines including 769 or may be built into the loyalty program server 710. The information sent to the loyalty program server 710 from the clearinghouse server 341 and received by the clearing house server 341 from the loyalty program server 710 is transmitted via the network connection 711. Along the route venue 702, one or more gaming machine and other gaming devices located in a plurality of properties send and receive loyalty program transaction information for the clearinghouse 341 via an Internet connection 712.

Components of the transaction clearinghouse server 341 may include 1) a memory storage unit for storing loyalty program transaction information in a transaction database, 2) a functional router enabling communication between the clearinghouse server and different properties, 3) a logic devices such as one or microprocessors, 4) a memory containing software for implementing the clearinghouse functions and 5) a network interface. The transaction database may contain on-going and past loyalty point instrument transactions processed using the clearinghouse server. The transaction database may be implemented using Microsoft NT (Microsoft, Redmond, Wash.) and SQL (server query language). The loyalty program servers, including 310 and 710, may also utilize this database technology.

Loyalty program instrument transaction information for two or more gaming properties may be stored in the clearinghouse server transaction database. The properties may be owned by the same or different gaming establishments. The transaction database may be accessed remotely by the properties, including 300 and 700, utilizing the clearinghouse server 341. Further, the transaction database may be used with analysis software to analyze transactions routed through the clearinghouse server 341.

The requirements associated with accounting and reporting of the loyalty program instrument information may be dependent on the regulations within a particular gaming jurisdiction. That being the case, the system is adaptable to those particular regulations. In general, a loyalty program instrument with an award amount may be considered to be analogous to a personal check written by the property where it was generated. When the loyalty program instrument is validated, it is essentially cashed. This implies that the property where the cashless instrument was generated must maintain a database of data related to those loyalty program instruments that were created on its property. This is analogous to maintaining a bank account whose sole purpose is to cover the loyalty program instruments that were generated at the property. This property is usually responsible for maintaining its loyalty program instrument database and validating loyalty program instruments. When a request to validate a loyalty program instrument is received by the loyalty program system at a particular gaming property, the property has the option of validating or rejecting the request. Once the property validates the loyalty program instrument, it is typically the responsibility of that property to insure its own loyalty program instrument transaction database is updated. At that time, the property which generated the loyalty program instrument, may transfer the funds to the property requesting the validation. The fund transfers may occur with each transaction or could be compiled in a batch to cover multiple instrument validation transactions on a periodic basis, eg. once a night. The transaction clearinghouse may facilitate all associated electronic fund transfers (EFTs) and acts as a third party between the parties.

Figure 8:
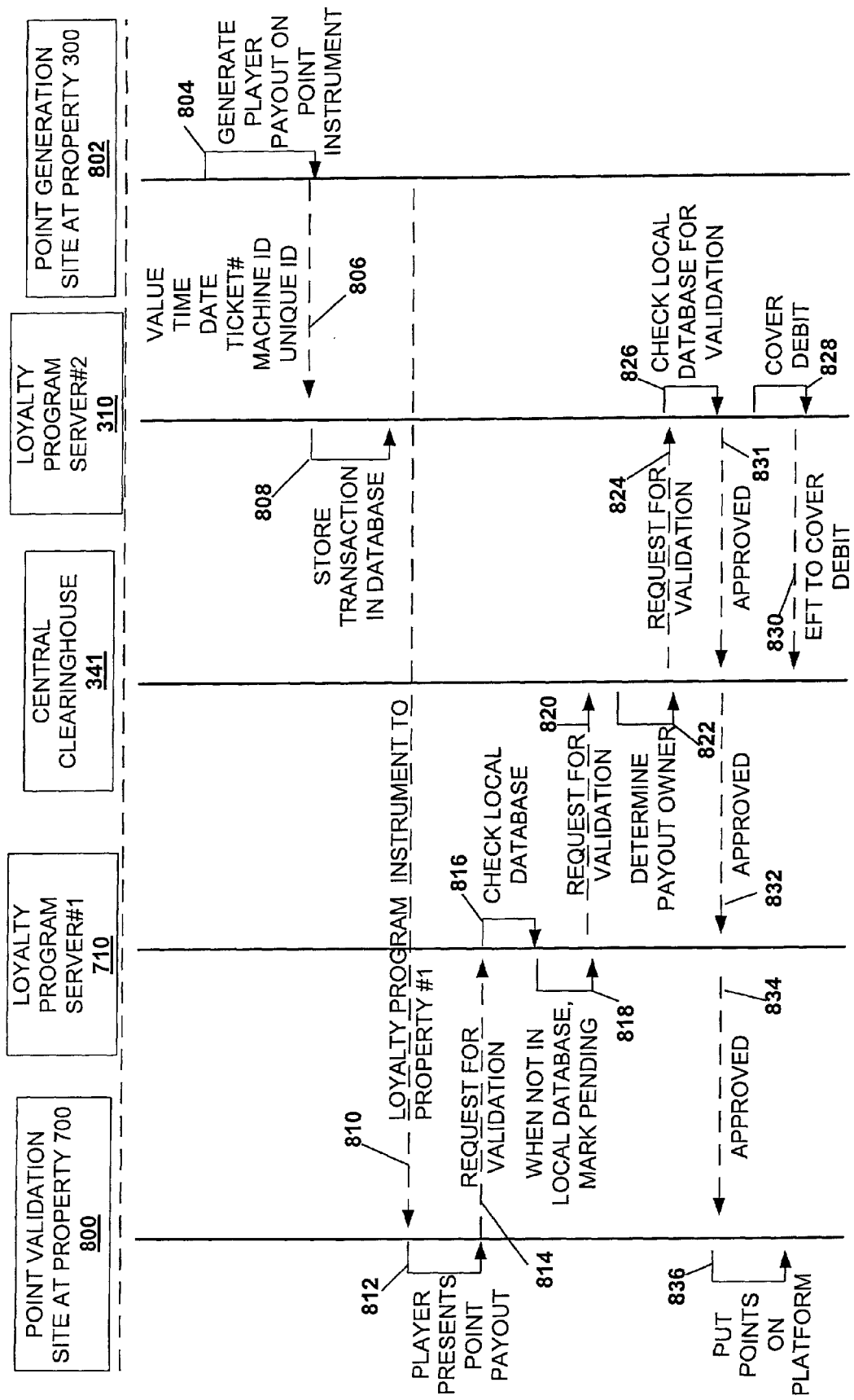
FIG. 8 is an interaction diagram for a loyalty program instrument transaction between a clearinghouse, loyalty program servers, and loyalty program instrument generators/ validators where the loyalty program instrument is generated at a different location from where it is validated.

FIG. 8 is an interaction diagram for a loyalty program instrument transaction between a clearinghouse, loyalty program servers, and loyalty program instrument generators/validators where the loyalty program instrument is generated at a different location from where it is validated. In 804, awarded loyalty points are generated on a loyalty program instrument at a loyalty program instrument generation site 802 at property 300. The loyalty program generation site may include but is not limited to a gaming machine, a clerk validation terminal, a wireless validation terminal, a casino kiosk and a cashier station. The loyalty program instrument may include a printed ticket voucher (e.g. EZPAY™ ticket), a smart card, a debit card, a room key and a portable wireless device. In 806, when the loyalty program instrument is generated, loyalty program transaction information, including but not limited to 1) a value, 2) an issue date, 3) an issue time, 4) a transaction number unique to the transaction, 5) a machine ID that generated the loyalty program instrument, 6) an issue location and 7) an instrument sequence number, may be transmitted to the loyalty program server 310. The loyalty program instrument transaction information is also stored on the loyalty program instrument when the loyalty program instrument is generated in 804. In 808, the loyalty program server 310 may store the loyalty program instrument transaction information in a database. The transaction information stored in the database is used when the loyalty program instrument is validated. The validation process may be invoked when the loyalty program instrument is redeemed for a prize or when the loyalty program instrument is used in a gaming machine or other device that accepts the loyalty program instrument. The validation process involves comparing the loyalty program instrument transaction information stored on the loyalty program instrument with the loyalty program instrument transaction information stored in the loyalty program server database.

In 810, a game player takes the loyalty program instrument generated at property 300 to property 700. In 812, the game player presents the loyalty program instrument for a prize redemption at a loyalty program transaction validation site 800 at property 700. The loyalty program transaction validation site may include a gaming machine, a cashier station, a clerk validation terminal, a wireless validation device and any other devices which accept loyalty program instruments. For instance, when a debit card is used as the loyalty program instrument, the game player may be able to directly deposit the awarded loyalty points on the debit card into a loyalty program account, such as a player tracking account, accessible to the game player. In 814, a validation request is sent from the loyalty program transaction validation site 800 to the loyalty program server 710. The validation request may be an information packet containing the transaction information stored on the loyalty program instrument in 804 and stored in the loyalty program server database in 808.

In 816, the loyalty program server 710 may check the local loyalty program transaction database on the loyalty program server 710 to determine if the loyalty program instrument was generated at property 300. The loyalty program server may check the local loyalty program transaction database in a number of ways to determine whether a transaction record for the loyalty program instrument resides in the database. The database search technique may depend on what information is stored in the local database and what information is stored on the loyalty program instrument. When the loyalty program instrument was generated at a property using a different loyalty program system than the property where the loyalty program instrument is validated, the type and amount of loyalty program instrument transaction information stored on the loyalty program instrument may differ from the type and amount of loyalty program transaction information stored on the local loyalty program transaction instrument database. Thus, the search technique may depend on determining a common set of transaction information stored on the loyalty program instrument being validated and stored in the loyalty program transaction database. For instance, when the loyalty program instrument contains a machine ID and the loyalty program transaction database stores a list of all the local machine IDs, the loyalty program server 710 may search the local loyalty program transaction database to determine whether the loyalty program instrument was generated on one of the local machines at the property 700. As another example, when the loyalty program instrument contains transaction information on the property where the loyalty program instrument was generated or the owner of the loyalty program instrument (e.g. the owner of the property), the loyalty program server 710 may quickly determine whether the loyalty program instrument was generated at the local property 700.

In 818, when the loyalty program instrument was not generated locally, the loyalty program server 710 may mark the validation request pending in a local database and send a request for validation to the central clearinghouse 341 in 820. The request for validation from the loyalty program server 710 to the loyalty program instrument transaction clearinghouse 341 may contain all or some subset of the information stored on the loyalty program instrument being validated. In addition, the request for validation may contain information about the loyalty program transaction validation site. For example, the identification information about the loyalty program transaction validation site 800, the property 700 where the loyalty program transaction validation site is being validated and the owner of the may be included in the request for validation message.

As in 814, the request for validation in 820 may be an information packet of some type sent using a predetermined communication protocol between the loyalty program server 710 and the central clearinghouse 341. The communication protocol used to transmit transaction information between the loyalty program transaction validation site 800 and the loyalty program server 710 in 814 may be the same or different than the communication protocol used to transmit the transaction information between the loyalty program server 710 and the loyalty program instrument transaction clearinghouse 341 in 820.

In 822, the loyalty program transaction clearinghouse determines the owner of the loyalty program instrument (e.g. the property where the loyalty program instrument was generated). The clearinghouse 341 determines the owner based upon information received in the validation request in 820 and based upon information stored in the clearinghouse 341. In 824, using routing information stored within the clearinghouse 341, a request for validation is sent from the clearinghouse 341 to the property where the loyalty program instrument was generated (i.e. property 300 in this embodiment). The request for validation is an information packet in a communication protocol of some type. The transaction information contained within the information packet is sufficient to allow the loyalty program server 310 at the loyalty program generation site 802 at property 300 to validate the loyalty program instrument. The communication protocol used to transmit the transaction information between the loyalty program server 310 and the clearinghouse 341 in 820 may be the same or different than the communication protocol used to transmit the transaction information between the loyalty program instrument transaction clearinghouse 341 and the loyalty program server 710 in 824. For example, the communication protocols may be different when the loyalty program system used at property 700 is different from the loyalty program system used at property 300.

In 826, the loyalty program server 300 checks the local loyalty program instrument transaction database to confirm the request for validation received in 824 is valid. When the transaction is valid (e.g. the loyalty program instrument was generated at property 300 and has not been previously validated), in 831, an approval message may be sent from the loyalty program server 310 to the clearinghouse 341, in 832, the clearinghouse may forward or generate the approval message to the loyalty program sever 710, in 834, the loyalty program server 310 may forward or generate the approval message to the loyalty program transaction validation site 800. In 828, the loyalty program server may represent the transaction as a debit and cover the debit by allocating or transferring finds to an account used to cover debits. For example, each loyalty point may be assigned a pre-determined value such as a $0.01 US dollars. In 830, the loyalty program server 310 may send an Electronic Fund Transfer (EFT) to cover the debit to the clearinghouse 341. The EFT may be sent after each transfer or may be sent as a batch at the end of some time period, e.g. at the end of each day.

In 836, the validation site 800 at property 700, performs an appropriate operation when the validation is approved. For example, when the validation site 800 is a gaming machine, loyalty points may be posted on the gaming machine. As another example, when the validation site 800 is a cashier station, the player may receive a prize according to the value of the loyalty program instrument.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A computer-implemented method of awarding loyalty points to a patron of a gaming establishment on a gaming apparatus, the computer-implemented method comprising:
   receiving in the gaming apparatus a first loyalty program instrument storing computer readable data representing loyalty points earned from a first activity not associated with the gaming apparatus;
   validating the first loyalty program instrument;
   receiving activity data associated with a second activity by the patron of said gaming establishment;
   determining based on the activity data that the second activity accrues additional loyalty points;
   accruing the additional loyalty points for the patron during the second activity;
   awarding to the patron some or all of the additional loyalty points accrued during the second activity;
   combining the additional loyalty points and the loyalty points earned from the first activity; and
   issuing to the patron a computer readable loyalty program instrument storing the combined loyalty points thereon as computer readable data.

2. The computer-implemented method of claim 1, wherein the gaming establishment is a casino.

3. The computer-implemented method of claim 1, wherein the gaming establishment is a gaming entity comprising a plurality of venues.

4. The computer-implemented method of claim 1, wherein said second activity is playing a gaming machine of the gaming establishment.

5. The computer-implemented method of claim 1, wherein said second activity is playing a game of chance within the gaming establishment.

6. The computer-implemented method of claim 1, wherein said first activity is selected from the group comprising a food purchase, an entertainment purchase, a transportation purchase, a lodging purchase, a merchandise purchase and a service purchase.

7. The computer-implemented method of claim 6, wherein said second activity occurs in a venue within the gaming establishment.

8. The computer-implemented method of claim 6, wherein said second activity occurs in a venue affiliated with the gaming establishment.

9. The computer-implemented method of claim 8, wherein the venue affiliated with the gaming establishment is in communication with the gaming establishment via the Internet.

10. The computer-implemented method of claim 1, wherein the stored combined loyalty points are redeemable for at least one of comps, goods and services provided by the gaming establishment.

11. The computer-implemented method of claim 1, wherein a rate at which the patron accrues loyalty points varies according to one or more of a time of day, days of a week, months of a year, an amount wagered, a game denomination, a promotional event, a game type and a rate of wagering.

12. The computer-implemented method of claim 1, wherein the accruing of loyalty points begins without receiving a player tracking card from the patron.

13. The computer-implemented method of claim 1, wherein the accruing of loyalty points begins without receiving player tracking information from the patron.

14. The computer-implemented method of claim 1, wherein the patron has a player tracking account with the gaming establishment.

15. The computer-implemented method of claim 1, wherein the patron has a player tracking account with the gaming establishment, and wherein the accrued loyalty points are awarded to said patron anonymously, without crediting the patron's player tracking account.

16. The computer-implemented method of claim 1, further comprising:
converting some or all of the accrued loyalty points to at least one of goods and services without crediting any of the loyalty points to a player tracking account.

17. The computer-implemented method of claim 1, further comprising:
crediting the loyalty points stored on the loyalty point instrument to a player tracking account of the patron.

18. The computer-implemented method of claim 17, wherein the loyalty points are credited to the patron's player tracking account using at least one of a phone, a gaming machine, a clerk validation terminal, a cashier station, a casino kiosk, a hand-held wireless device, a video display interface in a hotel room and a mailing service.

19. The computer-implemented method of claim 1, wherein the first loyalty program instrument is at least one of a printed ticket, a magnetic striped card, a room key, a portable wireless device, and a smart card.

20. The computer-implemented method of claim 1, wherein the first loyalty program instrument is configured to store one or more of prize information, loyalty point information, an establishment, a location, a bar code, a instrument type, an issue date, a validation number, an issue time, an instrument number, an instrument sequence number and a machine number.

21. The computer-implemented method of claim 1, further comprising:
redeeming the stored combined loyalty points for one or more of comps, goods, and services using at least one of a phone, a gaming machine, a clerk validation terminal, a cashier station, a casino kiosk, a hand-held wireless device, a web interface, a video display interface located in a hotel room, and a mailing service.

22. The computer-implemented method of claim 1, wherein the issued computer readable loyalty program instrument is the received first loyalty program instrument updated with the stored combined loyalty points.

23. The computer implemented method of claim 1, wherein the issued computer readable loyalty program instrument is new.

24. A computer-implemented method of awarding loyalty points to a game player on a gaming machine, the computer-implemented method comprising:
receiving in the gaming machine a first machine readable loyalty program instrument storing loyalty points earned from a first activity not associated with the gaming machine;
validating the first loyalty program instrument;
receiving first gaming event data associated with a first gaming activity on the gaming machine;
detecting, based on the first gaming event data, the first gaming activity initiated by the game player at the gaming machine;
in response to detecting the first gaming activity, accruing loyalty points;
receiving second gaming event data associated with a second gaming activity on the gaming machine;
detecting, based on said second gaming event data, the second gaming activity at the gaming machine;
in response to detecting the second gaming activity, accruing additional loyalty points;
awarding to the game player some or all of the accrued loyalty points and the accrued additional loyalty points;
combining the awarded loyalty points and the earned loyalty points; and
issuing to the game player a machine readable loyalty program instrument storing the combined loyalty points thereon as machine readable data.

25. The computer-implemented method of claim 24, wherein the loyalty program instrument is configured to store data representing one or more of prize information, loyalty point information, an establishment, a location, a bar code, a instrument type, an issue date, a validation number, an issue time, an instrument number, an instrument sequence number, and a machine number.

26. The computer-implemented method of claim 24, wherein the loyalty program instrument is at least one of a printed ticket, a magnetic striped card, a room key, a portable wireless device and a smart card.

27. The computer-implemented method of claim 24, wherein the first gaming event data represents one or more of depositing an indicia of credit into the gaming machine, inserting a card into a card reader located on the gaming machine, activating an input button on the gaming machine, inputting a loyalty program instrument into a gaming device on the gaming machine, and entering a code into the gaming machine.

28. The computer-implemented method of claim 24, further comprising:
storing information to the loyalty program instrument.

29. The computer-implemented method of claim 24, wherein the second gaming event data represents one or more of detecting zero credits registered on the gaming machine, the gaming machine remaining idle for an amount of time, detecting a tilt condition, detecting an error condition, and detecting a game player's request for a loyalty program instrument.

30. The computer-implemented method of claim 24, wherein the first machine readable loyalty point instrument is received into the gaming machine using at least one of a card reader, a wireless interface, a bill validator, and a ticket reader.

31. The computer-implemented method of claim 24, further comprising:
displaying the awarded amount of loyalty points to the game player.

32. The computer-implemented method of claim 24, further comprising:
storing loyalty program transaction information on a memory device located on the gaming machine.

33. The computer-implemented method of claim 24, further comprising:
sending loyalty program transaction information to a gaming device located outside of the gaming machine.

34. The computer-implemented method of claim 24, further comprising:
displaying a prize menu wherein the prize menu includes one or more prizes redeemable for an amount of loyalty points;
receiving a prize selection selected from the one or more prizes displayed on the prize menu; and
when the amount of loyalty points required to redeem the prize is less than an amount of loyalty points available on the gaming machine,
issuing a loyalty program instrument wherein said loyalty program instrument is used to redeem the selected prize.

35. The computer-implemented method of claim 24, further comprising:
presenting a game play sequence between the first gaming activity and the second gaming activity wherein said game play sequence includes game play of one or more games.

36. The computer-implemented method of claim 35, wherein the one or more games is selected from the group consisting of video slot games, mechanical slot games, video black jack games, video poker games, video keno games, video pachinko games, video card games, video games of chance and combinations thereof.

37. The computer-implemented method of claim 24, wherein a rate at which the player accrues loyalty points varies according to one or more of a time of day, days of a week, months of a year, an amount wagered, a game denomination, a promotional event, a game type and a rate of wagering.

38. The computer-implemented method of claim 24, wherein the loyalty points are accrued without receiving a player tracking card from the game player.

39. The computer-implemented method of claim 24, wherein the loyalty points are accrued without receiving player tracking information from the game player.

40. The computer-implemented method of claim 24, further comprising:
performing a loyal program instrument transaction.

41. The computer-implemented method of claim 24, further comprising
presenting on the gaming machine at least one of a particular game, a particular bonus game, a game feature and a bonus game feature in exchange for an amount of loyalty points redeemed on the gaming machine.

42. The computer-implemented method of claim 24, wherein said accrued loyalty points are determined by a logic device located on the gaming machine.

43. The computer-implemented method of claim 24, further comprising the gaming machine communicating information representing loyalty points to a second gaming machine.

44. The computer-implemented method of claim 43, further comprising:
simultaneously accruing loyalty points on the gaming machine and the second gaming machine;
communicating an amount of loyalty points awarded on the second gaming machine to the first gaming machine;
combining an amount of loyalty points awarded on the second gaming machine with an amount of loyalty points awarded on the first gaming machine; and
issuing a machine readable loyalty program instrument storing the combined awarded loyalty points thereon as machine readable data.

45. The computer-implemented method of claim 43, further comprising: wherein the player tracking points are accrued without initiating a player tracking session.

46. The computer-implemented method of claim 24, wherein the issued machine readable loyalty program instrument is the received first machine readable loyalty program instrument updated with the stored combined loyalty points.

47. The computer implemented method of claim 24, wherein the issued machine readable loyalty program instrument is new.

48. A gaming apparatus comprising one or more processors configured for processing the following steps:
receiving in the gaming apparatus a first loyalty program instrument storing computer readable data representing loyalty points earned from a first activity not associated with the gaming apparatus;
validating the first loyalty program instrument;
receiving activity data associated with a second activity by the patron of said gaming establishment;
determining based on the activity data that the second activity accrues additional loyalty points;
accruing the additional loyalty points for the patron during the second activity;
awarding to the patron some or all of the additional loyalty points accrued during the second activity;
combining the additional loyalty points and the loyalty points earned from the first activity; and
issuing a computer readable loyalty program instrument storing the combined loyalty points thereon as computer readable data.

49. A gaming machine comprising one or more processors configured for processing the following steps:
receiving in the gaming machine a first machine readable loyalty program instrument storing loyalty points earned from a first activity not associated with the gaming machine;
validating the first loyalty program instrument;
receiving first gaming event data associated with a first gaming activity on the gaming machine;
detecting, based on the first gaming event data, the first gaming activity initiated at the gaming machine;
in response to detecting the first gaming activity, accruing loyalty points;
receiving second gaming event data associated with a second gaming activity on the gaming machine;
detecting, based on the second gaming event data, the second gaming activity at the gaming machine;
in response to detecting the second gaming activity, accruing additional loyalty points;
awarding some or all of the accrued loyalty points and the accrued additional loyalty points;
combining the awarded loyalty points and the earned loyalty points; and
issuing a machine readable loyalty program instrument storing the combined loyalty points thereon as machine readable data.

* * * * *